United States Patent
Sato et al.

(10) Patent No.: US 6,987,644 B2
(45) Date of Patent: Jan. 17, 2006

(54) THIN FILM MAGNETIC HEAD INCLUDING COIL WOUND IN TOROIDAL SHAPE AND METHOD FOR MANUFACTURING THE SAME

(75) Inventors: Kiyoshi Sato, Niigata-ken (JP); Sumihito Morita, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 234 days.

(21) Appl. No.: 10/716,830

(22) Filed: Nov. 17, 2003

(65) Prior Publication Data

US 2004/0100728 A1 May 27, 2004

(30) Foreign Application Priority Data

| Nov. 22, 2002 | (JP) | ............................. 2002-339365 |
| Mar. 12, 2003 | (JP) | ............................. 2003-066275 |
| Aug. 14, 2003 | (JP) | ............................. 2003-293381 |

(51) Int. Cl.
*G11B 5/147* (2006.01)
*G11B 5/17* (2006.01)

(52) U.S. Cl. ....................................... 360/123; 360/126
(58) Field of Classification Search ................ 360/126, 360/123
See application file for complete search history.

(56) References Cited

U.S. PATENT DOCUMENTS

| 5,703,740 | A | * | 12/1997 | Cohen et al. ................ 360/126 |
| 5,995,342 | A | * | 11/1999 | Cohen et al. ................ 360/126 |
| 6,195,232 | B1 | * | 2/2001 | Cohen ........................ 360/126 |
| 6,246,541 | B1 | | 6/2001 | Furuichi et al. |
| 6,256,864 | B1 | | 7/2001 | Gaud et al. |
| 6,335,846 | B1 | | 1/2002 | Gaud et al. |
| 2002/0167759 | A1 | | 11/2002 | Sato |
| 2004/0012884 | A1 | * | 1/2004 | Sato et al. ................... 360/126 |
| 2004/0100727 | A1 | * | 5/2004 | Sato et al. ................... 360/123 |
| 2004/0100728 | A1 | * | 5/2004 | Sato et al. ................... 360/123 |
| 2004/0100731 | A1 | * | 5/2004 | Sato ........................... 360/126 |
| 2004/0218306 | A1 | * | 11/2004 | Sato et al. ................... 360/123 |
| 2005/0128648 | A1 | * | 6/2005 | Sato et al. ................... 360/321 |

FOREIGN PATENT DOCUMENTS

| GB | 2 390 933 | 1/2004 |
| JP | 11-273028 | 10/1999 |
| JP | 11316910 | 11/1999 |
| JP | 2002-311311 | 11/2000 |
| JP | 2001-52310 | 2/2001 |
| JP | 2002-170205 | 6/2002 |

* cited by examiner

*Primary Examiner*—Allen Cao
(74) *Attorney, Agent, or Firm*—Brinks Hofer Gilson & Lione

(57) ABSTRACT

A thin film magnetic head and a method for manufacturing the same is provided, wherein first coil pieces and second coil pieces provided one above the other with a magnetic pole layer therebetween are electrically connected to each other with reliability and with ease, and the above-described magnetic pole layer can be provided on a flattened surface. A laminate provided on a coil insulation layer can be formed on a flattened surface and, therefore, the above-described magnetic pole layer can be formed into a predetermined shape. As a result, the track width can have a predetermined dimension, and the second coil pieces provided on the above-described laminate can be reliably, easily connected to the top surfaces of connection layers exposed at the top surface of the coil insulating layer.

33 Claims, 22 Drawing Sheets

THIN FILM MAGNETIC HEAD INCLUDING COIL WOUND IN TOROIDAL SHAPE AND METHOD FOR MANUFACTURING THE SAME

BACKGROUND OF THE INVENTION

1. Field of the Invention

The present invention relates to a thin film magnetic head for recording used in, for example, a floating magnetic head. In particular, the present invention relates to a thin film magnetic head and a method for manufacturing the same, wherein first coil pieces and second coil pieces provided one above the other with a magnetic layer therebetween are electrically connected to each other with reliability and with ease, and the magnetic layer can be provided on a flattened surface.

2. Description of the Related Art

Each of known documents, Japanese Unexamined Patent Application Publication No. 11-273028, Japanese Unexamined Patent Application Publication No. 2000-311311, Japanese Unexamined Patent Application Publication No. 2002-170205, and U.S. Pat. No. 6,335,846 B1, discloses a configuration of a coil layer wound in a toroidal shape around a core constituting an inductive head (recording head).

Preferably, the above-described coil layer is allowed to have a toroidal shape in order to make full use of a three-dimensional space around the above-described core and, thereby, it is expected that miniaturization of the inductive head can be realized and the magnetization efficiency becomes excellent.

However, the toroidal coil structures described in the above-described patent documents have the following problems.

Each of these documents describes that lower coil layers provided under a core layer (for example, an upper core layer) and upper coil layers provided on the above-described core layer are electrically connected via connection layers, and this connection layer is formed by, for example, digging a through hole connected to the above-described lower coil layer in an insulating layer provided on the lower coil layer and, thereafter, growing a layer of plating from this through hole.

However, a plurality of lower coil layers, described above, are densely provided in a narrow region, and the two-dimensional size of the above-described connection layer is smaller than the width of the lower coil layer in each document. Consequently, it is practically difficult to form the through hole connected to each lower coil layer if significantly high-precise etching technique is not available. Furthermore, the above-described etching has a high risk of damaging the lower coil layer.

With respect to the growth of the connection layer by plating from the above-described through hole, if the above-described through hole is not properly dug to reach the top surface of the lower coil layer, growth of plating cannot be appropriately performed. If formation of the above-described connection layer by plating is terminated, for example, midway through the above-described through hole, electrical connection to the upper coil layer tends to become unstable.

The top surface of the insulating layer provided on the above-described lower coil layer is undulated due to, for example, height difference between the above-described lower coil layer and the lower core layer. Since the upper core layer must be formed on the top surface of the above-described insulation layer having such undulations, the above-described upper core layer cannot be patterned into a predetermined shape. In addition, it is essentially difficult to form the above-described through hole having a predetermined shape in the insulating layer having undulations. Furthermore, since the upper coil layers provided on the above-described upper core layer with another insulating layer therebetween are also provided on a surface having undulations, electrical connection between the above-described upper coil layers and the lower coil layers via the connection layers tends to become unstable.

SUMMARY OF THE INVENTION

Accordingly, the present invention is for overcoming the above-described known problems. In particular, it is an object of the present invention to provide a thin film magnetic head and a method for manufacturing the same, wherein first coil pieces and second coil pieces provided one above the other with a magnetic layer therebetween are electrically connected to each other with reliability and with ease, and the above-described magnetic layer can be provided on a flattened surface.

A thin film magnetic head according to an aspect of the present invention includes a protuberance layer having a predetermined length in the height direction from a surface facing a recording medium and a back gap layer located at a predetermined distance in the height direction from the rear end surface in the height direction of the above-described protuberance layer, each provided on a lower core layer extending in the height direction from the above-described facing-surface side, a magnetic layer connecting between the above-described protuberance layer and the back gap layer, and a coil layer wound in a toroidal shape around the above-described magnetic layer; wherein a plurality of first coil pieces extending in the direction intersecting the above-described magnetic layer are provided at predetermined spacings in the height direction in a space enclosed with the above-described lower core layer, the above-described protuberance layer, and the back gap layer, connection layers are provided while protruding from the end portions in the track-width direction of each first coil piece, and the above-described first coil pieces are covered with a coil insulating layer; all of the top surface of the above-described coil insulating layer, the top surface of the above-described protuberance layer, the top surface of the above-described back gap layer, and the top surfaces of the above-described connection layers are provided as the same flattened surface; the above-described magnetic layer is provided on the flattened surface of the above-described coil insulating layer, the protuberance layer, and the back gap layer; a plurality of second coil pieces crossing over the above-described magnetic layer are provided on the above-described magnetic layer with an insulating layer therebetween; and the end portions in the track-width direction of each second coil piece are electrically connected to the top surfaces of connection layers exposed at the above-described flattened surface, and the end portions of the above-described first coil pieces adjacent to each other are connected via the above-described second coil pieces, so that the above-described coil layer wound in a toroidal shape is provided.

In the above-described aspect, the above-described first coil pieces are provided in the space enclosed with the lower core layer, the protuberance layer, and the back gap layer, the top surface of the coil insulating layer covering the above-described first coil pieces is provided as a flattened surface, and the top surfaces of the connection layers protruding from the end portions of the above-described first coil pieces are exposed at surfaces flush with this flattened surface.

Therefore, the magnetic layer provided on the above-described coil insulating layer can be formed on the flattened surface, and the above-described magnetic layer can be thereby formed into a predetermined shape. As a result, the track width Tw can have a predetermined dimension, and the second coil pieces provided on the above-described magnetic layer and the top surfaces of the connection layers exposed at the top surface of the above-described coil insulating layer can be reliably, easily connected. Since the top surfaces of the coil insulating layer and the connection layers are flattened, slimming of the whole thin film magnetic head can be achieved.

In a thin film magnetic head according to another aspect of the present invention, a plurality of first coil pieces extending in the direction intersecting the above-described magnetic layer are provided in a space enclosed with the above-described lower core layer, the above-described protuberance layer, and the back gap layer, and the above-described first coil pieces are covered with a coil insulating layer; the above-described magnetic layer is provided on the above-described coil insulating layer, the protuberance layer, and the back gap layer, the above-described magnetic layer is covered with an insulating layer having the top surface provided as a flattened surface; a plurality of second coil pieces crossing over the above-described magnetic layer are provided on the flattened surface of this insulating layer; and the top surfaces of connection layers electrically connected to the end portions in the track-width direction of each first coil piece are exposed at surfaces flush with the above-described flattened surface, the end portions in the track-width direction of each second coil piece are electrically connected to the top surfaces of the above-described connection layers and, thereby, the end portions of the above-described first coil pieces adjacent to each other are connected via the above-described second coil pieces, so that the above-described coil layer wound in a toroidal shape is provided.

In the present aspect, the insulating layer covering the above-described magnetic layer is provided as a flattened surface, and the top surfaces of the connection layers electrically connected to the end portions in the track-width direction of each first coil piece are exposed at surfaces flush with this flattened surface.

Consequently, the second coil piece provided on the above-described insulating layer can be formed into a predetermined shape and, in addition, the second coil pieces and the first coil pieces can be electrically connected via the connection layers with reliability and with ease. In the present aspect, there is a further advantage in that insulation between the above-described second coil pieces and the above-described magnetic layer can be excellently maintained.

In a thin film magnetic head according to another aspect of the present invention, a plurality of first coil pieces extending in the direction intersecting the above-described magnetic layer are provided in a space enclosed with the above-described lower core layer, the above-described protuberance layer, and the back gap layer, lower connection layers are provided while protruding from the end portions in the track-width direction of each first coil piece, and the above-described first coil pieces are covered with a coil insulating layer; all of the top surface of the above-described coil insulating layer, the top surface of the above-described protuberance layer, the top surface of the above-described back gap layer, and the top surfaces of the above-described lower connection layers are provided as the same flattened surface; the above-described magnetic layer is provided on the above-described flattened surface of the above-described coil insulating layer, the protuberance layer, and the back gap layer, and upper connection layers electrically connected to the above-described lower connection layers are provided; the above-described magnetic layer is covered with an insulating layer having the top surface provided as a flattened surface, and the top surfaces of the above-described upper connection layers are exposed at surfaces flush with the above-described flattened surface; and a plurality of second coil pieces crossing over the above-described magnetic layer are provided on the flattened surface of the above-described insulating layer, the end portions in the track-width direction of each second coil piece are electrically connected to the upper connection layers exposed at the above-described flattened surface, and the end portions of the above-described first coil pieces adjacent to each other are connected via the above-described second coil pieces, so that the above-described coil layer wound in a toroidal shape is provided.

In the present aspect, the top surface of the coil insulating layer covering the above-described first coil pieces is provided as a flattened surface, the top surface of the lower connection layers electrically connected to the end portions of the above-described first coil pieces are exposed at surfaces flush with this flattened surface, the top surface of the insulating layer covering the top surface of the above-described magnetic layer is provided as a flattened surface, and the top surfaces of the upper connection layers electrically connected to the above-described lower connection layers are exposed at surfaces flush with this flattened surface.

Therefore, the magnetic layer provided on the above-described coil insulating layer can be formed on the flattened surface, and the above-described magnetic layer can be thereby formed into a predetermined shape. Consequently, the track width Tw can have a predetermined dimension. Since the second coil pieces provided on the above-described insulating layer can be formed on the flattened surface, the above-described second coil piece can be formed into a predetermined shape and, in addition, the above-described second coil pieces and the first coil pieces can be electrically connected via the connection layers with reliability and with ease.

In the present invention, a laminated structure composed of a lower magnetic pole layer, a gap layer, and an upper magnetic pole layer for serving as the above-described magnetic layer in that order from the bottom may be provided on the above-described protuberance layer, and a track width Tw may be determined by the width dimension in the track-width direction of the above-described laminated structure in the above-described facing-surface.

In the present invention, the laminated structure including a lower magnetic pole layer, a gap layer, and an upper magnetic pole layer may be connected to the lower core layer with the above-described protuberance layer therebetween in the side of the surface facing the recording medium and with the back gap layer therebetween in the height direction side. Therefore, the above-described magnetic layer may be formed into a planar shape on the above-described first coil pieces, the track width Tw may easily have a predetermined dimension, and reduction of the magnetic path length may be achieved.

In the present invention, the above-described protuberance layer may be a magnetic pole end layer in which at least a lower magnetic pole layer, a gap layer formed from a non-magnetic metal material, and an upper magnetic pole layer are provided by plating in that order from the bottom and in which a track width Tw may be regulated by the width dimension in the track-width direction in the facing-surface, and the above-described magnetic layer may be laminated on the above-described magnetic pole end layer.

In the present invention, the above-described magnetic pole end layer may be provided at the end portion of the above-described lower core layer in the side of the surface facing the recording medium, and the above-described magnetic layer may serve as the upper core layer connecting the height side of the above-described lower core layer and the above-described magnetic pole end layer. The above-described first coil pieces and the above-described second coil pieces may be wound around the above-described magnetic layer for serving as the upper core layer.

When the above-described magnetic layer serves as the upper core layer in the present invention, preferably, the saturation magnetic flux density of the above-described magnetic layer is lower than that of the above-described upper magnetic pole layer in order to prevent magnetic recording outside the recording track width.

In the present invention, with respect to at least one pair of the above-described first coil pieces adjacent to each other, the distance between the end portions adjacent to each other in the height direction of the above-described first coil pieces is larger than a minimum distance between the above-described first coil pieces in the region overlapping the above-described magnetic layer.

With respect to an inductive thin film magnetic head, preferably, the volume of a magnetic circuit for flowing a magnetic flux is reduced and, thereby, inductance is reduced. Consequently, the length in the height direction of the above-described magnetic pole layer must be decreased, and the distance between the above-described first coil pieces in the region overlapping the above-described magnetic layer is also decreased. At this time, by increasing the distance between the end portions adjacent to each other in the height direction of the above-described first coil pieces, as in the present invention, the end portions of the above-described first coil pieces and the end portions of the above-described second coil pieces can be easily, reliably connected.

When the above-described plurality of first coil pieces include portions parallel to each other in the region overlapping the above-described magnetic layer, the magnetic field induced from the above-described coil layer to the above-described magnetic layer is preferably stabilized.

With respect to at least one pair of the above-described second coil pieces adjacent to each other, preferably, the distance between the end portions adjacent to each other in the height direction of the above-described second coil pieces is larger than a minimum distance between the above-described second coil pieces in the region overlapping the above-described magnetic layer for a similar reason.

In this case as well, preferably, the above-described plurality of second coil pieces include portions parallel to each other in the region overlapping the above-described magnetic layer.

In the present invention, preferably, the length dimension of the above-described second coil piece in a first direction orthogonal to the direction of a current flow is larger than the length dimension of the above-described first coil piece in the above-described first direction, and the film thickness of the above-described second coil piece is larger than the film thickness of the above-described first coil piece in order to reduce the heat generation of the above-described coil layer.

A method for manufacturing a thin film magnetic head according to another aspect of the present invention includes the steps of (a) forming a lower core layer extending in the height direction from the side of a surface facing a recording medium, (b) forming a coil insulating substrate layer on the above-described lower core layer and, thereafter, forming a plurality of first coil pieces extending in the direction intersecting the above-described height direction, at predetermined spacings in the height direction, on the above-described coil insulating substrate layer in a predetermined region, (c) forming a protuberance layer from the above-described facing-surface toward the height direction on the above-described lower core layer while the location of the protuberance layer is suitable for avoiding contact with the above-described first coil pieces, forming a back gap layer on the above-described lower core layer while the location of the back gap layer is at a distance in the height direction from the rear end surface in the height direction of the above-described protuberance layer and is suitable for avoiding contact with the above-described first coil pieces, and forming connection layers protruding from the end portions in the track-width direction of each first coil piece, (d) covering the above-described first coil pieces with a coil insulating layer and, thereafter, polishing the above-described coil insulating layer, the protuberance layer, the back gap layer, and the connection layers until the top surface of the above-described protuberance layer, the top surface of the above-described coil insulating layer, the top surface of the back gap layer, and the top surfaces of the connection layers are provided as the same flattened surface, (e) forming a magnetic layer on the above-described flattened surface of the above-described coil insulating layer, the protuberance layer, and the back gap layer to connect between the above-described protuberance layer and the back gap layer, and (f) forming an insulating layer on the above-described magnetic layer, forming a plurality of second coil pieces on this insulating layer while the second coil pieces cross over the above-described magnetic layer, connecting the end portions in the track-width direction of each second coil piece to the top surfaces of the connection layers exposed at the above-described flattened surface, and connecting the end portions of the above-described first coil pieces adjacent to each other via the above-described second coil pieces, so that a coil layer wound in a toroidal shape is provided.

According to the method for manufacturing a thin film magnetic head of the present aspect, the above-described first coil pieces are formed on the lower core layer with the coil insulating substrate layer therebetween in the above-described step (b), and the protuberance layer, the back gap layer, and the connection layers are formed in the above-described step (c). Consequently, after the above-described first coil pieces are covered with the coil insulating layer, a polishing step can be performed in order that the top surface of the above-described protuberance layer, the top surface of the above-described coil insulating layer, the top surface of the back gap layer, and the top surfaces of the connection layers are provided as the same flattened surface in the above-described step (d).

As a result, the magnetic layer can be formed on the above-described flattened coil insulating layer, protuberance layer, and back gap layer to connect between the protuberance layer and the back gap layer in the above-described step (e). Since the above-described magnetic layer can be formed into a predetermined shape and, in addition, the top surfaces of the above-described connection layers are exposed at the same flattened surface as the top surface of the above-described coil insulating layer, the end portions in the track-width direction of the above-described second coil pieces can be electrically connected to the top surfaces of the above-described connection layers with reliability and with ease in the above-described step (f).

In the present aspect, preferably, the above-described protuberance layer, the back gap layer, and the connection layers are simultaneously formed from the same material in the above-described step (c) in order to speed up the manufacturing process and facilitate the formation of the above-described connection layers.

In the present aspect, instead of the above-described step (f), the manufacturing method may include the steps of (g) forming upper connection layers on the above-described connection layers while the upper connection layers extend to the locations higher than the top surface of the above-described magnetic layer, (h) covering the above-described magnetic layer with an insulating layer and, thereafter, polishing the above-described insulating layer and the upper connection layers until the top surfaces of the above-described upper connection layers and the top surface of the above-described insulating layer are provided as the same flattened surface, and (i) forming a plurality of second coil pieces on the flattened surface of the above-described insulating layer while the second coil pieces cross over the above-described magnetic layer, connecting the end portions in the track-width direction of each second coil piece to the top surfaces of the upper connection layers exposed at the above-described flattened surface, and connecting the end portions of the above-described first coil pieces adjacent to each other via the above-described second coil pieces, so that a coil layer wound in a toroidal shape is provided.

In the present aspect, the polishing step is performed until the top surfaces of the above-described upper connection layers are provided as the same flattened surface as the top surface of the insulating layer covering the above-described magnetic layer. As a result, the above-described second coil pieces can be formed on the flattened surface and, in addition, the end portions of the above-described second coil pieces can be electrically connected to the end portions of the above-described first coil pieces via the upper connection layers and the connection layers with reliability and with ease.

According to the present invention described above in detail, the first coil pieces are provided in the space enclosed with the lower core layer, the protuberance layer, and the back gap layer, the top surface of the coil insulating layer covering the above-described first coil pieces is provided as a flattened surface, and the top surfaces of the connection layers protruding from the end portions of the above-described first coil pieces are exposed at surfaces flush with this flattened surface.

Therefore, the magnetic pole layer provided on the above-described coil insulating layer can be formed on the flattened surface, and the above-described magnetic pole layer can be thereby formed into a predetermined shape. As a result, the track width Tw can have a predetermined dimension, and the second coil pieces provided on the above-described magnetic pole layer and the top surfaces of the connection layers exposed at the top surface of the above-described coil insulating layer can be reliably, easily connected. Furthermore, the insulating layer can be provided as a flattened surface on the above-described magnetic pole layer, and the top surfaces of the upper connection layers electrically connected to the above-described connection layers (lower connection layers) can be exposed at this flattened surface.

In such a case, the above-described second coil pieces can be formed on the flattened surface, the second coil piece can be formed into a predetermined shape and, in addition, the above-described second coil pieces can be further reliably, easily connected to the top surfaces of the above-described upper connection layers.

Furthermore, by increasing the distance between the end portions adjacent to each other in the height direction of the above-described first coil pieces and/or the above-described second coil pieces, as in the present invention, the end portions of the above-described first coil pieces and the end portions of the above-described second coil pieces can be easily, reliably connected.

When a plurality of the above-described first coil pieces and/or the above-described second coil pieces include portions parallel to each other in the region overlapping the above-described magnetic pole layer, the magnetic field induced from the above-described coil layer to the above-described magnetic pole layer is stabilized.

DESCRIPTION OF THE PREFERRED EMBODIMENTS

Figure 1:
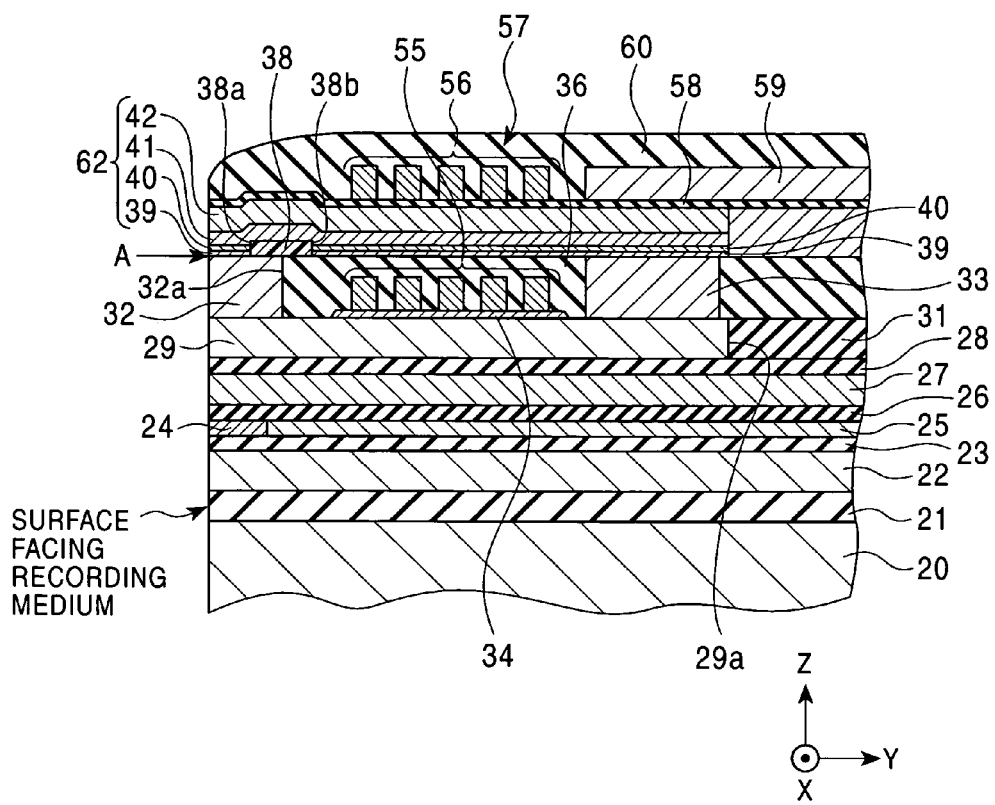
FIG. 1 is a vertical sectional view showing the structure of a thin film magnetic head according to a first embodiment of the present invention.
Figure 2:
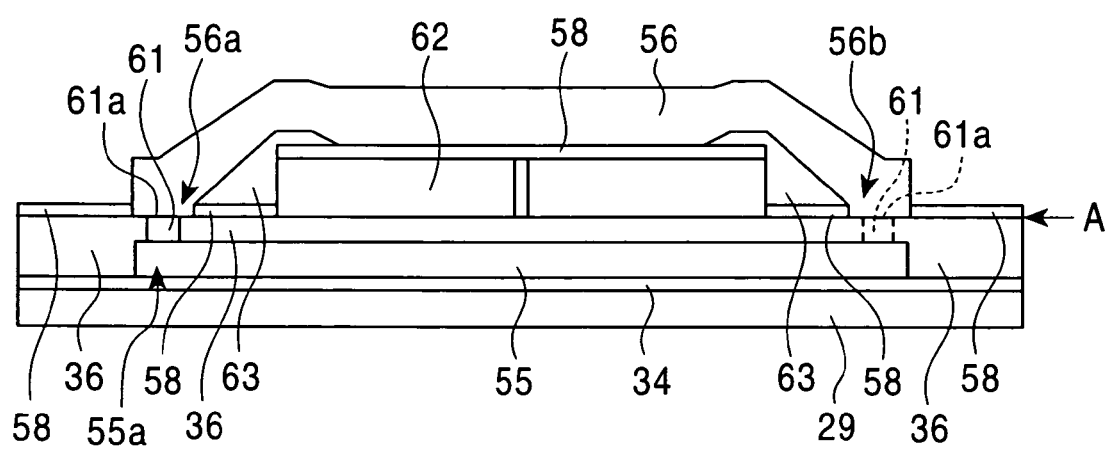
FIG. 2 is a partial front view of the thin film magnetic head shown in FIG. 1.
Figure 3:
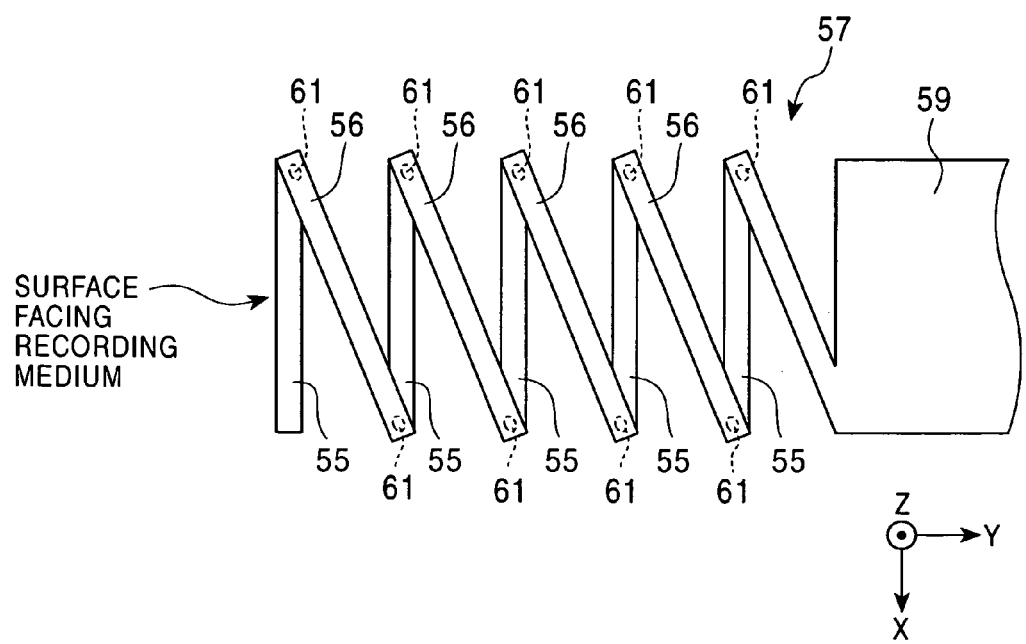
FIG. 3 is a partial plan view showing a coil shape of a coil layer of the thin film magnetic head shown in FIG. 1.
Figure 4:
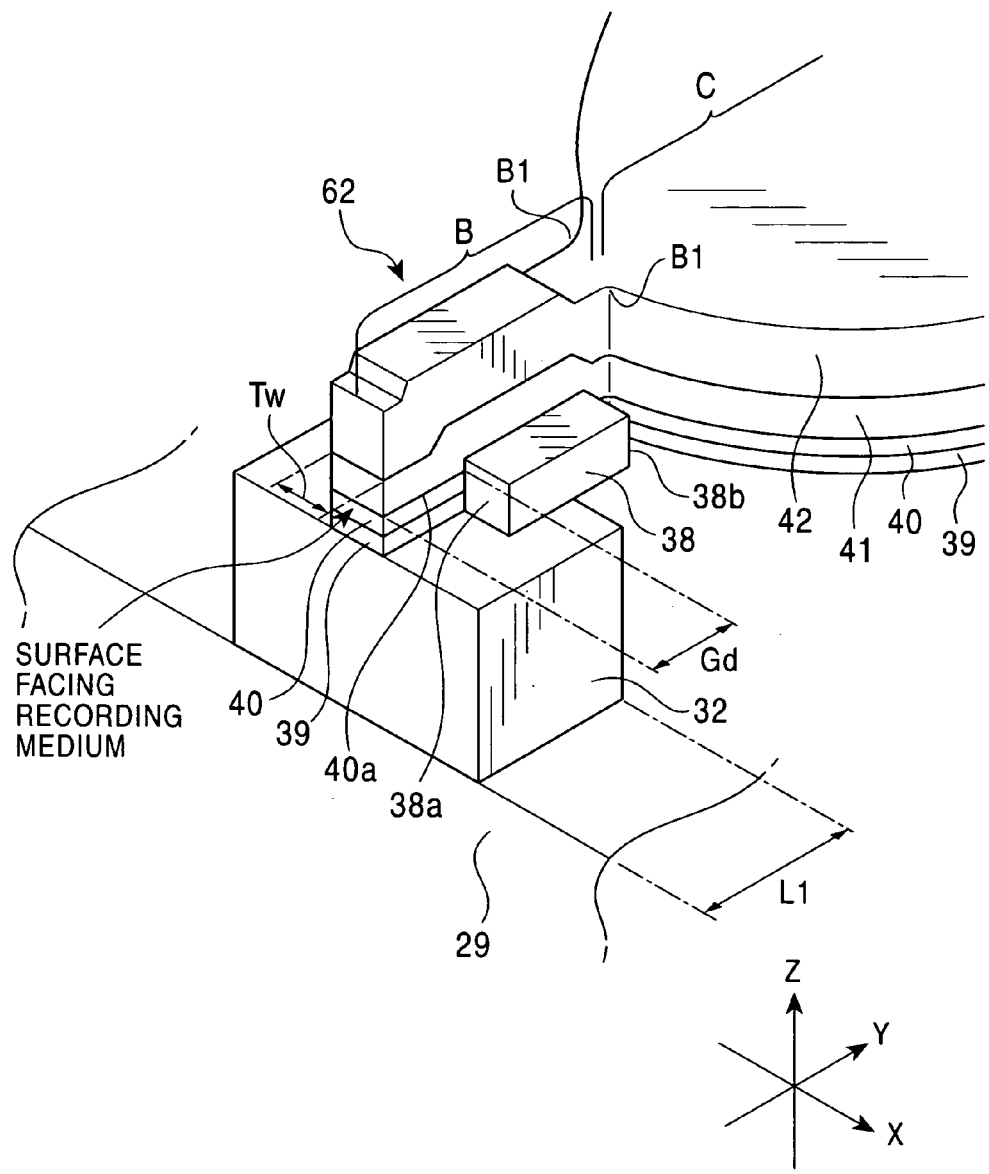
FIG. 4 is a partial perspective view of the magnified thin film magnetic head shown in FIG. 1.

FIG. 1 is a partial vertical sectional view showing the structure of a thin film magnetic head according to the first embodiment of the present invention. FIG. 2 is a partial front view of the thin film magnetic head shown in FIG. 1 wherein a protuberance layer 32, a protective layer 60, an MR head, and the like are not shown in the diagram, and a first coil piece, a second coil piece, and the like provided at the locations closest to a surface facing a recording medium are viewed from the side of the surface facing the recording medium. FIG. 3 is a partial plan view showing a coil structure of the thin film magnetic head shown in FIG. 1. FIG. 4 is a partial perspective view of a magnified part of the structure of the thin film magnetic head shown in FIG. 1.

Hereafter the X direction shown in the drawing is referred to as the track-width direction, and the Y direction shown in the drawing is referred to as the height direction. The Z direction shown in the drawing is the direction of movement of the recording medium (magnetic disk). A front end surface (a leftmost surface shown in FIG. 1) of the thin film magnetic head is referred to as "a surface facing a recording medium". With respect to each layer, "a front end surface" refers to a left-side surface shown in FIG. 1, and "a rear end surface" refers to a right-side surface shown in FIG. 1.

The thin film magnetic head described with reference to the drawings is a thin film magnetic head including a combination of a recording head (may be referred to as an inductive head) and a playback head (may be referred to as an MR head). However, the thin film magnetic head may be simply composed of the recording head.

Reference numeral 20 denotes a substrate formed from alumina-titanium carbide ($Al_2O_3$—TiC) or the like, and an $Al_2O_3$ layer 21 is provided on the above-described substrate 20.

A lower shield layer 22 formed from a NiFe-based alloy, sendust, or the like is provided on the above-described $Al_2O_3$ layer 21, and a lower gap layer 23 formed from $Al_2O_3$ or the like is provided on the above-described lower shield layer 22.

A magnetoresistance effect element 24 typified by a GMR element, e.g., a spin-valve type thin film element, having a predetermined length in the height direction (the Y direction shown in the drawing) from the surface facing the recording medium is provided on the above-described lower gap layer 23. Electrode layers 25 long-extending in the height direction (the Y direction shown in the drawing) are provided in both sides of the above-described magnetoresistance effect element 24 in the track-width direction (the X direction shown in the drawing).

An upper gap layer 26 formed from $Al_2O_3$ or the like is provided on the above-described magnetoresistance effect element 24 and the electrode layers 25, and an upper shield layer 27 formed from a NiFe-based alloy or the like is provided on the above-described upper gap layer 26.

The layers from the above-described lower shield layer 22 to the above-described upper shield layer 27 are referred to as the playback head (may be referred to as the MR head).

As shown in FIG. 1, a separation layer 28 formed from $Al_2O_3$ or the like is provided on the above-described upper shield layer 27. The above-described upper shield layer 27 and the separation layer 28 may not be provided, and a following lower core layer 29 may be provided on the above-described upper gap layer 26. In such a case, the above-described lower core layer 29 doubles as the upper shield layer.

In FIG. 1, the lower core layer 29 is provided on the above-described separation layer 28. The above-described lower core layer 29 is formed from a magnetic material, e.g., a NiFe-based alloy. The above-described lower core layer 29 has a predetermined length dimension in the height direction (the Y direction shown in the drawing) from the surface facing the recording medium. A non-magnetic insulating material layer 31 is provided at the rear in the height direction of the rear end surface 29a of the above-described lower core layer 29 and in both sides of the above-described lower core layer 29 in the track-width direction (the X direction shown in the drawing). As shown in FIG. 1, the surface of each of the above-described lower core layer 29 and the non-magnetic insulating material layer 31 is a continuous flattened surface.

The protuberance layer 32 having a predetermined length L1 (refer to FIG. 4) in the height direction (the Y direction shown in the drawing) from the surface facing the recording medium is provided on the above-described lower core layer 29. A back gap layer 33 is provided on the above-described lower core layer 29 while the location of the back gap layer is at a predetermined distance in the height direction (the Y direction shown in the drawing) from the rear end surface 32a in the height direction of the above-described protuberance layer 32.

The above-described protuberance layer 32 and the back gap layer 33 are formed from a magnetic material, and these may be formed from the same material as that for the above-described lower core layer 29 or be formed from another material. Each of the above-described protuberance layer 32 and the back gap layer 33 may be a single layer or may has a multilayer laminated structure. The above-described protuberance layer 32 and the back gap layer 33 are magnetically connected to the above-described lower core layer 29.

As shown in FIG. 1, a coil insulating substrate layer 34 is provided between the above-described protuberance layer 32 and the back gap layer 33 on the lower core layer 29, and a plurality of first coil pieces 55 parallel to each other are provided on the above-described coil insulating substrate layer 34 while the first coil pieces 55 are extended parallel to the track-width direction (the X direction shown in the drawing) and are arranged side by side in the height direction, as shown in FIG. 3. Each of the first coil pieces 55 may be extended in the track-width direction (the X direction shown in the drawing) while being inclined toward the height direction.

The above-described first coil pieces 55 are covered with a coil insulating layer 36 formed from an inorganic insulating material, e.g., $Al_2O_3$. As shown in FIG. 1, the top surface of the above-described protuberance layer 32, the top surface of the coil insulating layer 36, and the top surface of the back gap layer 33 are a continuous flattened surface along the reference surface A shown in FIG. 1.

As shown in FIG. 2 and FIG. 3, connection layers 61 having electrical conductivity are provided as protrusions in the track-width direction (the X direction shown in the drawing) on the end portions 55a of the above-described first coil pieces 55. The two-dimensional shape (that is, the shape of a surface cut from the direction parallel to the X-Y plane) of the above-described connection layer 61 can be selected from various shapes, e.g., an ellipse as shown in FIG. 3, a circle, a square, a rectangle, and a rhombus. Preferably, the above-described connection layer 61 is formed from the same material as that for the above-described protuberance layer 32 and the back gap layer 33 from the viewpoint of the manufacturing process, as described below. However, the material may be different from that for the above-described protuberance layer 32 and the back gap layer 33. The above-described connection layer 61 may have a single-layer structure or a multilayer laminated structure. The above-described connection layers 61 are in the condition of being electrically connected to the end portions 55a of the above-described first coil pieces 55. The term "electrically connected" refers to a condition in which there is electrical continuity between two layers regardless of direct connection or indirect connection. Hereafter the same holds true.

with respect to the above-described connection layers 61, as is clear from FIG. 3, the first coil piece 55 provided at the location closest to the surface facing the recording medium is provided with the above-described connection layer 61 simply on the upper-side end portion shown in the drawing, and other first coil pieces 55 are provided with the above-described connection layers 61 on both end portions in the track-width direction (the X direction shown in the drawing).

As shown in FIG. 2, the top surfaces 61a of the connection layers 61 provided on the end portions 55a in the track-width direction (the X direction shown in the drawing) of each first coil piece 55 are flush with the above-described reference surface A. That is, with respect to the thin film magnetic head shown in FIG. 1, all of the top surface of the above-described protuberance layer 32, the top surface of the coil insulating layer 36, the top surface of the back gap layer 33, and the top surfaces 61a of the connection layers 61 are provided as the same flattened surface.

As shown in FIG. 1, a Gd-determining layer 38 is provided from the location at a predetermined distance in the height direction (the Y direction shown in the drawing) from the above-described surface facing the recording medium toward the height direction on the flattened surface of the above-described protuberance layer 32 and the coil insulating layer 36.

In the embodiment shown in FIG. 1, the front end surface 38a of the above-described Gd-determining layer 38 is located on the protuberance layer 32, and the rear end surface 38b of the above-described Gd-determining layer 38 is located on the coil insulating layer 36.

As shown in FIG. 1, a lower magnetic pole layer 39 and a gap layer 40 are provided in that order from the bottom on the protuberance layer 32 from the surface facing the recording medium to the above-described front end surface 38a of the above-described Gd-determining layer 38, on the coil insulating layer 36 from the rear end surface 38b of the above-described Gd-determining layer 38 toward the height direction, and on the above-described back gap layer 33. The above-described lower magnetic pole layer 39 and the gap layer 40 are provided by plating.

As shown in FIG. 1, an upper magnetic pole layer 41 for serving as a magnetic layer in the present invention is provided by plating on the above-described gap layer 40 and the Gd-determining layer 38, and an upper core layer 42 is provided by plating on the above-described upper magnetic pole layer 41. The above-described upper magnetic pole layer 41 is directly or indirectly connected to the above-described lower core layer 29 with the above-described back gap layer 33 therebetween. The above-described lower magnetic pole layer 39, the gap layer 40, and the upper magnetic pole layer 41 constitute a laminated structure of the present invention.

In the present embodiment, a laminate 62 is composed of four layers of the above-described lower magnetic pole layer 39, the gap layer 40, the upper magnetic pole layer 41, and the upper core layer 42.

As shown in FIG. 1 and FIG. 2, an insulating layer 58 formed from an insulating material, e.g., $Al_2O_3$, is provided on the above-described upper core layer 42. Preferably, the above-described insulating layer 58 is formed from an inorganic insulating material. This insulating layer 58 is also provided on the coil insulating layer 36 extending in both sides of the above-described laminate 62 in the track-width direction (the X direction shown in the drawing). As shown in FIG. 2, insulating layers 63 formed from an organic insulating material, e.g., a resist, are provided over both end portions in the track-width direction (the X direction shown in the drawing) of the above-described insulating layer 58 and both sides in the track-width direction of the above-described laminate 62. The insulating layer 58 formed from the inorganic insulating material is provided by a sputtering method or the like. Since the above-described insulating layer 58 can have a film thickness smaller than that of the insulating layer 63 formed from the organic insulating material, the laminate 62 and the second coil pieces 56 described below can be brought close to each other, and the magnetization efficiency can be increased. In addition, insulation between the above-described laminate 62 and the second coil pieces 56 can be excellently maintained in both sides of the above-described laminate 62 in the track-width direction.

As shown in FIG. 1 to FIG. 3, a plurality of second coil pieces 56 parallel to each other are provided on the above-described insulating layers 58 and 63 while being arranged side by side in the height direction. The second coil pieces 56 are extended in the track-width direction (the X direction shown in the drawing) while being inclined toward the height direction (the Y direction shown in the drawing). Each of the second coil pieces 56 may be provided while being extended in the direction parallel to the track-width direction (the X direction shown in the drawing).

As shown in FIG. 3, the above-described first coil pieces 55 and the second coil pieces 56 are non-parallel to each other. As shown in FIG. 2 and FIG. 3, the left end portion 55a in the track-width direction of the first coil piece 55 and the left end portion 56a in the track-width direction of the second coil piece 56 face each other in the film thickness direction (the Z direction shown in the drawing) of the laminate 62, and the left end portion 55a and the left end portion 56a are electrically connected to each other via the connection layer 61. The right connection layer 61 indicated by a dotted line shown in FIG. 2 electrically connects the right end portion of the first coil piece 55 located at the back (the Y direction shown in the drawing) of the first coil piece 55 visible in the drawing and the right end portion 56b of the second coil piece 56 visible in the drawing.

As described above, in the thin film magnetic head shown in FIG. 1, the end portion in the track-width direction of the first coil piece 55 and the end portion in the track-width direction of the second coil piece 56 facing one above the other in the film thickness direction of the above-described laminate 62 are electrically connected to each other via the connection layer 61 and, thereby, a toroidal coil structure 57 is provided.

A layer denoted by reference numeral 60 shown in FIG. 1 is a protective layer formed from $Al_2O_3$ or the like, and a layer denoted by reference numeral 59 shown in FIG. 1 and FIG. 3 is a lead layer. The above-described lead layer 59 is integrally formed with the second coil piece 56 located at the front end in the height direction.

The features of the thin film magnetic head shown in FIG. 1 will be described below.

In the thin film magnetic head shown in FIG. 1, the plurality of first coil pieces 55 are provided in the space enclosed with the above-described lower core layer 29, the protuberance layer 32, and the back gap layer 33. The space in which the above-described first coil pieces 55 can be provided is appropriately formed by protruding the protuberance layer 32 and the back gap layer 33 on the above-described lower core layer 29. In particular, when the above-described protuberance layer 32 and the back gap layer 33 are provided by plating, the above-described protuberance layer 32 and the back gap layer 33 can have large thicknesses. Consequently, the space enclosed with the above-described lower core layer 29, the protuberance layer 32, and the back gap layer 33 is allowed to become wide, and the above-described first coil pieces 55 having predetermined film thicknesses are easily provided.

The connection layers 61 are protruded from the end portions 55a in the track-width direction of each first coil piece 55. The top surfaces of the connection layers 61 are flush with the top surface of the above-described protuberance layer 32, the top surface of the back gap layer 33, and the top surface of the coil insulating layer 36 and, therefore, the top surfaces of the above-described connection layers 61 are in the condition of being exposed at the above-described flattened surface.

Consequently, in the thin film magnetic head shown in FIG. 1, the laminate 62 provided on the above-described protuberance layer 32, the coil insulating layer 36, and the back gap layer 33 can be formed on the above-described flattened surface, and the above-described laminate 62 can be formed into a predetermined shape. Therefore, the track-width dimension Tw determined by the width dimension in the track-width direction (the X direction shown in the drawing) of the upper magnetic pole layer 41 of the above-described laminate 62 in the surface facing the recording medium can be highly precisely adjusted at a predetermined dimension. In the present embodiment, the above-described track width Tw can be adjusted at within the range of 0.1 $\mu$m to 0.3 $\mu$m.

In the thin film magnetic head shown in FIG. 1, since the top surfaces 61a of the above-described connection layers 61 are exposed at the same flattened surface as the above-described coil insulating layer 36, the end portions in the track-width direction (the X direction shown in the drawing) of the above-described second coil pieces 56 can be electrically connected onto the above-described connection layers 61 with reliability and with ease. Consequently, poor electrical contact between the above-described first coil pieces 55 and the second coil pieces 56 can be prevented.

Since all of the top surfaces of the coil insulating layer 36, the top surface of the protuberance layer 32, the top surface of the back gap layer 33, and the top surfaces of the connection layers 61 are provided as the same flattened surface, the slimming of the whole thin film magnetic head can be facilitated.

Since the above-described laminate 62 having a linear shape parallel to the layer surface connects between the above-described protuberance layer 32 and back gap layer 33 and, thereby, the magnetic path is provided, reduction of the magnetic path length can be realized. Since the magnetic path length can be reduced, the speed of magnetic field reversal can be increased, and a thin film magnetic head having excellent high-frequency characteristics can be provided.

The above-described first coil piece 55 and the second coil piece 56 are formed from Cu or Au having excellent electrical conductivity. The above-described connection layer 61 may not be formed from the same material as that for the above-described first coil piece 55 and the second coil piece 56, and may be formed from a magnetic material or the like, as long as the material has electrical conductivity. Preferably, the above-described connection layer 61 is formed from the same magnetic material as that for the protuberance layer 32. As a result, the above-described connection layers 61 can be formed in the same step as that of the above-described protuberance layer 32 and the back gap layer 33 and, therefore, speedup of the manufacturing process can be achieved.

As described above, the top surface of the above-described coil insulating layer 36 is provided as a flattened surface. Preferably, the above-described coil insulating layer 36 is formed from an inorganic insulating material, e.g., $Al_2O_3$ or $SiO_2$, in order to realize this.

The shape of the above-described laminate 62 will be described. FIG. 4 is a perspective view showing an example of the above-described laminate 62. In FIG. 4, the two-dimensional shape of each of the lower magnetic pole layer 39, the gap layer 40, the upper magnetic pole layer 41, and the upper core layer 42 is composed of a front-end portion B and a rear-end portion C. The front-end portion B has a predetermined width dimension in the track-width direction (the X direction shown in the drawing) in the surface facing the recording medium, and extends in the height direction (the Y direction shown in the drawing) while keeping this width dimension. The rear-end portion C has a width in the track-width direction gradually increasing from both base ends B1 and B1 of the front-end portion B toward the height direction (the Y direction shown in the drawing). As described above, the track width Tw is regulated by the width dimension in the track-width direction (the X direction shown in the drawing) of the upper magnetic pole layer 41 in the surface facing the recording medium.

The above-described front-end portion B may take on a shape having a width dimension in the track-width direction gradually increasing from the surface facing the recording medium toward the height direction. In such a case, the rear-end portion C has a width dimension in the track-width direction further increasing from both base ends B1 and B1 of the above-described front-end portion B toward the height direction.

As shown in FIG. 4, a gap depth (Gd) is determined by the length in the height direction (the Y direction shown in the drawing) of the top surface 40a of the above-described gap layer 40 from the surface facing the recording medium to the above-described Gd-determining layer 38.

The materials for the lower magnetic pole layer 39 and the upper magnetic pole layer 41 will be described. Preferably, the above-described lower magnetic pole layer 39 and the upper magnetic pole layer 41 have saturation magnetic flux densities Bs higher than those of the upper core layer 42, the lower core layer 29, the protuberance layer 32, and the back gap layer 33. When the lower magnetic pole layer 39 and the upper magnetic pole layer 41 facing the gap layer 40 have high saturation magnetic flux densities, the recording magnetic field can be concentrated in the vicinity of the gap and, thereby, the packing density can be improved.

As shown in FIG. 1, the above-described lower magnetic pole layer 39 and the upper magnetic pole layer 41 further extend rearward of the Gd-determining layer 38 in the height direction (the Y direction shown in the drawing) and, therefore, a region exhibiting a high saturation magnetic flux density Bs can be provided at the location close to the first coil pieces 55 and the second coil pieces 56. Consequently, the magnetic flux efficiency can be improved, and a thin film magnetic head having excellent recording characteristics can be prepared.

The gap layer 40 shown in FIG. 1 is formed from a non-magnetic metal material, and is provided on the lower magnetic pole layer 39 by plating. Preferably, the above-described non-magnetic metal material is at least one selected from the group consisting of NiP, NiReP, NiPd, NiW, NiMo, NiRh, Au, Pt, Rh, Pd, Ru, and Cr. The gap layer 40 may have a single-layer structure or a multilayer structure.

The laminate 62 shown in FIG. 1 has a four-layer structure composed of the lower magnetic pole layer 39, the gap layer 40, the upper magnetic pole layer 41, and the upper core layer 42. However, the laminate 62 may have a three-layer structure composed of the lower magnetic pole layer 39, the gap layer 40, and the upper magnetic pole layer 41.

Figure 5:
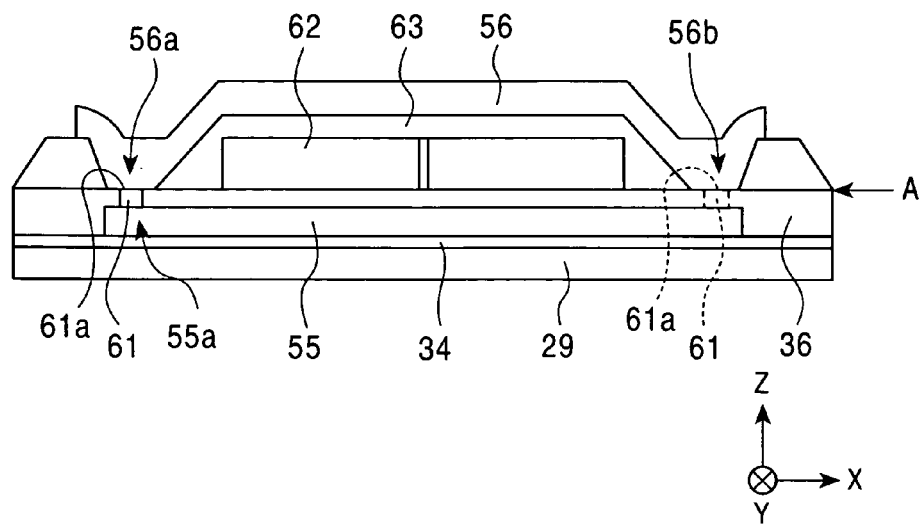
FIG. 5 is a partial front view showing the structure of a thin film magnetic head according to a second embodiment of the present invention.
Figure 6:
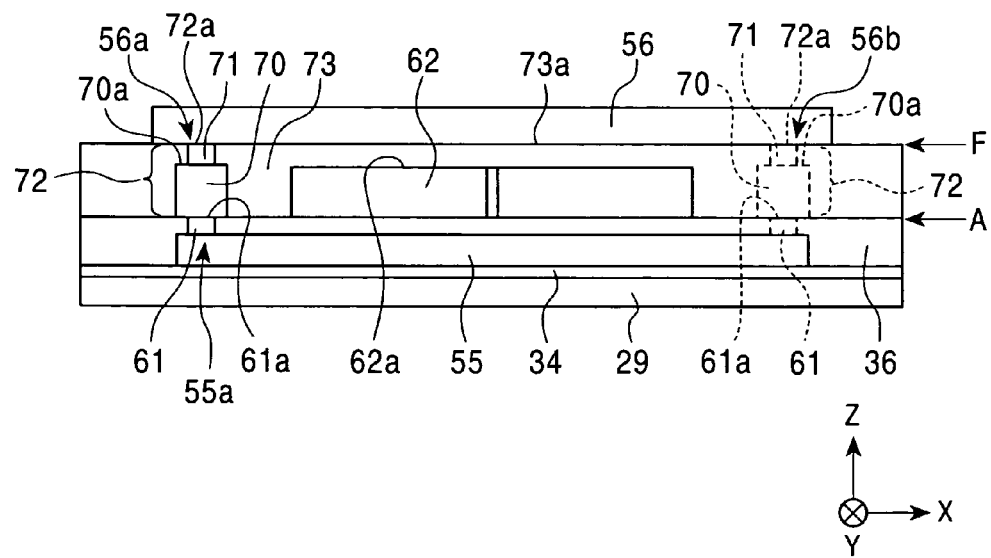
FIG. 6 is a partial front view showing the structure of a thin film magnetic head according to a third embodiment of the present invention.
Figure 7:
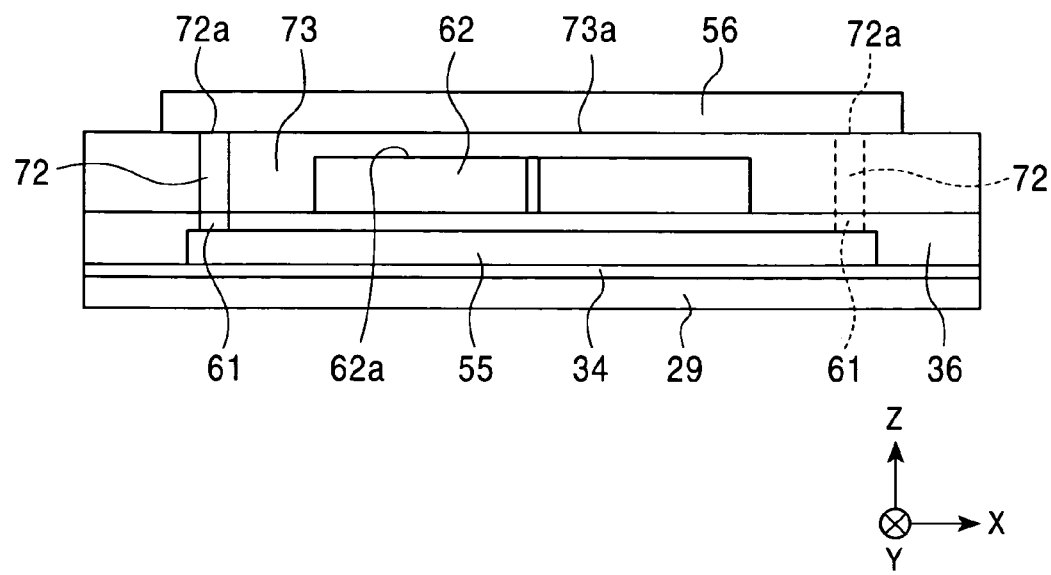
FIG. 7 is a partial front view showing the structure of a thin film magnetic head according to a fourth embodiment of the present invention.

Each of FIG. 5 to FIG. 7 shows a form different from that indicated by the partial front view of the thin film magnetic head shown in FIG. 2. FIG. 5 to FIG. 7 are partial front views showing a first coil piece, a second coil piece, and the like provided at the locations closest to a surface facing a recording medium while an MR head, a protuberance layer 32, a protective layer 60, and the like constituting the thin film magnetic head are not shown in the drawing.

In the thin film magnetic head shown in FIG. 5, in contrast to that shown in FIG. 2, an insulating layer 63 formed from an organic insulating material is provided over the top surface and the side surfaces of the above-described laminate 62 and, in contrast to that shown in FIG. 2, the insulating layer 58 formed from inorganic insulating material is not provided by sputtering on the top surface of the above-described laminate 62. The other parts are the same as those shown in FIG. 2 and, therefore, the top surfaces 61a of the above-described connection layers 61 are flush with the top surface of the above-described protuberance layer 32, the top surface of the back gap layer 33, and the top surface of the coil insulating layer 36 in the thin film magnetic head shown in FIG. 5 as well. As a result, the above-described laminate 62 can be provided on the above-described flattened surface, and the above-described laminate 62 can be formed into a predetermined shape.

Since the top surfaces 61a of the above-described connection layers 61 are exposed at the same flattened surface as the above-described coil insulating layer 36, the end portions in the track-width direction (the X direction shown in the drawing) of the above-described second coil pieces 56 can be electrically connected onto the above-described connection layers 61 with reliability and with ease.

In the thin film magnetic head shown in FIG. 6, the configuration of the layers under the reference surface A is the same as that shown in FIG. 2. That is, a plurality of first coil pieces 55 are provided in a space enclosed with a lower core layer 29, a protuberance layer 32, and a back gap layer 33, and the top surfaces 61a of connection layers (hereafter referred to as lower connection layers) 61 protruding from the end portions 55a in the track-width direction (the X direction shown in the drawing) of the first coil pieces 55 are flush with the top surface of the above-described protuberance layer 32, the top surface of the coil insulating layer 36, and the top surface of the back gap layer 33.

In FIG. 6, the above-described laminate 62 having a predetermined shape is highly precisely provided on the flattened surface of the top surface of the protuberance layer 32, the top surface of the coil insulating layer 36, and the top surface of the back gap layer 33, and first lifting layers 70 electrically connected to the above-described lower connection layers 61 are provided in both sides of the above-described laminate 62 in the track-width direction (the X direction shown in the drawing).

For example, this first lifting layer 70 is formed by plating from the same material as that for the above-described laminate 62 simultaneously with the formation of the above-described laminate 62. Consequently, the top surfaces 70a of the above-described first lifting layers 70 are provided at the same height as that of the top surface 62a of the above-described laminate 62. Since the above-described laminate 62 has the four-layer structure composed of the lower magnetic pole layer 39, the gap layer 40, the upper magnetic pole layer 41, and the upper core layer 42, the above-described first lifting layer 70 also has the four-layer structure composed of them. In the present embodiment, since the above-described gap layer 40 is formed by plating from electrically conductive NiP, the first lifting layer 70 can be formed by plating from the same material as that for the above-described laminate 62 simultaneously with the formation of the above-described laminate 62.

Electrically conductive second lifting layers 71 made of Cu or the like are provided on the above-described first lifting layers 70, and the above-described second lifting layers 71 and the first lifting layers 70 are electrically connected. In the present embodiment, the area of the above-described first lifting layer 70 in a plane flush with the X-Y plane shown in the drawing is larger than the area of the above-described lower connection layer 61 in a plane flush with the X-Y plane shown in the drawing and the area of the second lifting layer 71 in a plane flush with the X-Y plane shown in the drawing. However, the relationship among the values of above-described areas of these layers is not specifically limited.

In FIG. 6, an upper connection layer 72 is composed of two layers of the above-described first lifting layer 70 and the second lifting layer 71.

As shown in FIG. 6, the top surface and the side surfaces in the track-width direction of the above-described laminate 62 are covered with an insulating layer 73 formed from an inorganic insulating material, e.g., $Al_2O_3$, and this insulating layer 73 is also provided around the above-described upper connection layers 72.

As shown in FIG. 6, the top surface 73a of the above-described insulating layer 73 and the top surfaces 72a of the above-described upper connection layers 72 are provided as the same flattened surface along the reference surface A.

A plurality of second coil pieces 56 parallel to each other are provided on the above-described flattened insulating layer 73 and upper connection layers 72 while being non-parallel to the above-described first coil pieces 55 and being arranged side by side in the height direction. The second coil pieces 56 are extended in the direction parallel to the track-width direction (the X direction shown in the drawing), or are extended in the track-width direction while being inclined toward the height direction (the Y direction shown in the drawing).

As shown in FIG. 6, the end portions 56a and 56b in the track-width direction (the X direction shown in the drawing) of the above-described second coil pieces 56 are electrically connected to the top surfaces 72a of the above-described upper connection layers 72 and, thereby, a toroidal coil structure composed of the first coil pieces 55, the lower connection layers 61, the upper connection layers 72, and the second coil pieces 56 is constructed.

In the form shown in FIG. 6, the above-described upper connection layers 72 electrically connected to the above-described lower connection layers 61 are provided, the top surface 73a of the insulating layer 73 covering the above-described laminate 62 is provided as a flattened surface, and the top surfaces 72a of the above-described upper connection layers 72 are exposed at surfaces flush with this flattened surface.

Consequently, the above-described second coil pieces 56 can be formed on the flattened insulating layer 73 and, thereby, the above-described second coil piece 56 can be formed into a predetermined shape. In addition, the above-described connection layers are lifted to the same level as that of the locations where the above-described second coil pieces 56 are provided, the top surfaces 72a of the above-described upper-connection layers 72 are exposed at a reference surface F and, thereby, the end portions 56a and 56b in the track-width direction of the above-described second coil pieces 56 can be electrically connected to the above-described upper connection layers 72 with further reliability and with ease compared with that in the case where both sides in the track-width direction of the above-described second coil pieces 56 are bended downward and, thereby, the above-described second coil pieces 56 are connected to the top surfaces of the connection layers (lower connection layers) 61 exposed at the reference surface A, as shown in FIG. 2 and FIG. 5. Furthermore, insulation between the above-described second coil pieces 56 and the laminate 62 becomes more desirable by adopting the form shown in FIG. 6.

FIG. 7 shows a modified example of the coil structure shown in FIG. 6. In FIG. 7, an upper connection layer 72 electrically connected to the above-described lower connection layer 61 has a single-layer structure. The above-described upper connection layer 72 is formed from a conductive material, e.g., Cu. In this FIG. 7 as well, in a manner similar to that shown in FIG. 6, the top surfaces 72a of the above-described upper connection layers 72 are provided as the same flattened surface as the top surface 73a of the insulating layer 73 covering the top surface of the above-described laminate 62, and the top surfaces 72a of the above-described upper connection layers 72 are exposed at the above-described flattened surface. Consequently, the second coil piece 56 can be formed into a predetermined shape and, in addition, the end portions 56a and 56b in the track-width direction of the above-described second coil pieces 56 can be electrically connected to the above-described upper connection layers 72 with further reliability and with ease.

The structure of the above-described upper connection layer 72 is not limited to the laminated structure of two layers as shown in FIG. 6 or a single-layer structure as shown in FIG. 7, and may be a laminated structure of at least three layers.

In the embodiments shown in FIG. 6 and FIG. 7, both of the top surface of the insulating layer 36 and the top surfaces of the lower connection layers 61 under the laminate 62 are provided as the same flattened surface along the reference surface A. However, with respect to the configuration, the relationship between the locations of the top surface of the above-described insulating layer 36 and the top surfaces of the lower connection layers 61 may not be limited, while at least the top surface 73a of the insulating layer 73 covering the above-described laminate 62 and the top surfaces 72a of the above-described upper connection layers 72 are provided as the same flattened surface.

A method for manufacturing the thin film magnetic head shown in FIG. 1 will be described below with reference to the manufacturing step diagrams shown in FIG. 8 to FIG. 16. A method for forming each layer of the lower core layer 29 to the second coil pieces 56 shown in FIG. 1 will be described. Each of the manufacturing step diagrams shown in FIG. 8 to FIG. 16 is a vertical sectional view (that is, a sectional view showing a cross section parallel to the X-Z plane shown in the drawing) of the thin film magnetic head at some midpoint in manufacture.

Figure 8:
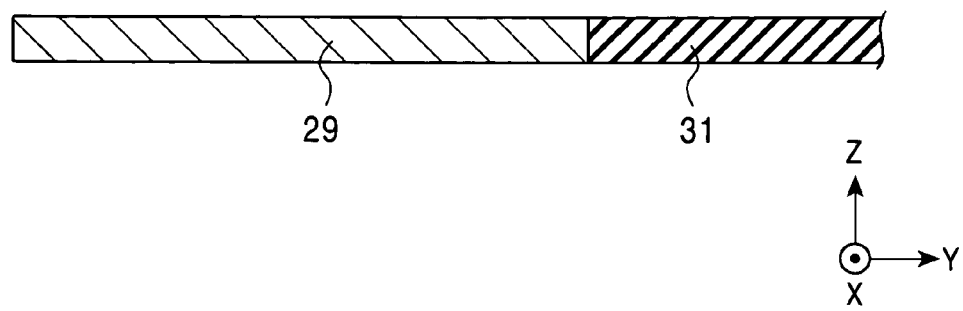
FIG. 8 is a diagram showing a step of a method for manufacturing the thin film magnetic head shown in FIG. 1 according to the present invention.

In the step shown in FIG. 8, the lower core layer 29 made of a NiFe-based alloy or the like is formed by plating, and a portion from the rear-end surface in the height side of the above-described lower core layer 29 toward the height direction (the Y direction shown in the drawing) and both sides in the track-width direction (the X direction shown in the drawing) of the above-described lower core layer 29 are covered with a non-magnetic insulating material layer 31 made of $Al_2O_3$ or the like. Subsequently, the surface of the above-described lower core layer 29 and the surface of the non-magnetic insulating material layer 31 are polished by using a CMP technology or the like, so that a flattened surface is provided.

Figure 9:
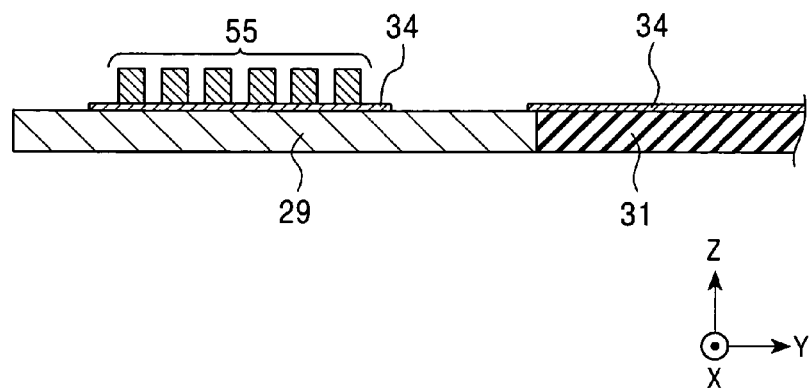
FIG. 9 is a diagram showing a step performed following the step shown in FIG. 8.

In the step shown in FIG. 9, the coil insulating substrate layer 34 made of $Al_2O_3$ or the like is formed by sputtering or the like on the surface of the above-described lower core layer 29 and the surface of the non-magnetic insulating material layer 31. The first coil pieces 55 are formed by patterning on the above-described coil insulating substrate layer 34. The above-described first coil pieces 55 are formed by plating from a non-magnetic conductive material, e.g., Cu.

A plurality of first coil pieces 55 are provided parallel to each other. Each first coil piece 55 is extended parallel to the track-width direction (the X direction shown in the drawing) or is extended in the track-width direction (the X direction shown in the drawing) while being inclined toward the height direction (the Y direction shown in the drawing). Subsequently, the coil insulating substrate layer 34 is removed from the region where the protuberance layer 32 and the back gap layer 33 are to be provided in the following step.

Figure 10:
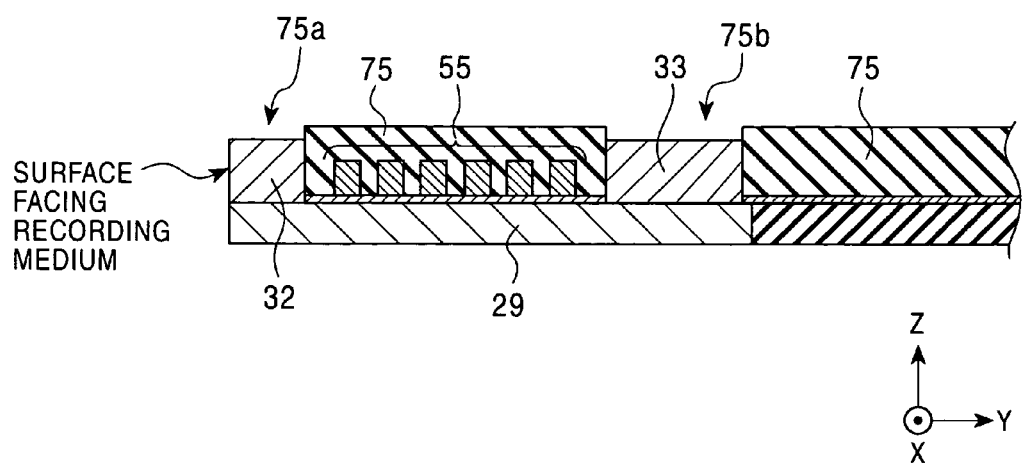
FIG. 10 is a diagram showing a step performed following the step shown in FIG. 9.

In the step shown in FIG. 10, a resist layer 75 is applied to the above-described coil insulating substrate layer 34, and hole portions 75a and 75b are formed in this resist layer 75 by an exposure phenomenon. The above-described hole portion 75a is provided in the region from the surface facing the recording medium to the vicinity of the front-end portion of the above-described first coil piece 55 provided at the location closest to the surface facing the recording medium among the above-described first coil pieces 55, and the above-described hole portion 75b is provided in the vicinity of the base end portion of the above-described lower core layer 29. The protuberance layer 32 is formed by plating on the above-described lower core layer 29 exposed at the hole portion 75a, and in the same step, the back gap layer 33 is formed by plating on the base end portion of the above-described lower core layer 29 exposed at the hole portion 75b. The coil insulating substrate layer 34 is not present between the above-described protuberance layer 32 and the lower core layer 29 and between the back gap layer 33 and the lower core layer 29. Consequently, these layers are magnetically connected to each other.

Figure 11:
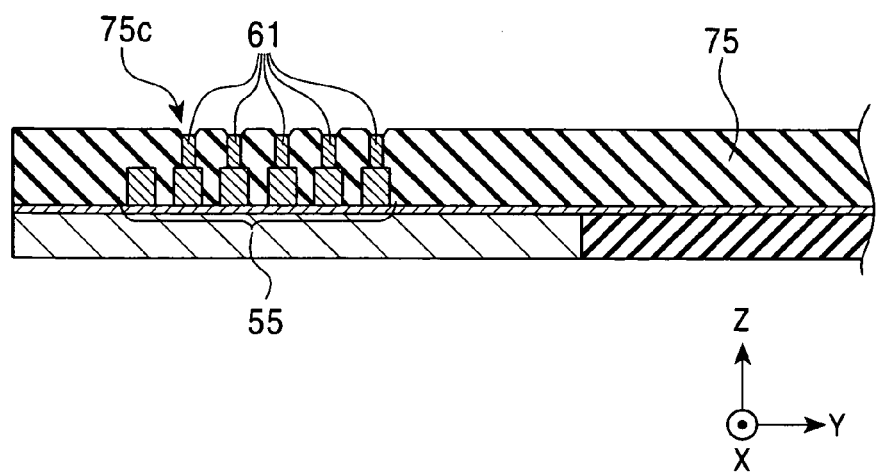
FIG. 11 is a diagram showing a step performed simultaneously with the step shown in FIG. 10.

FIG. 11 is a partial vertical sectional view of the thin film magnetic head, showing a cross section different from that shown in FIG. 10. FIG. 11 is the partial vertical sectional view showing, for example, a cross section parallel to the X-Z plane in the vicinity of the right end portion in the track-width direction (the X direction shown in the drawing) of the above-described first coil piece 55.

The step shown in FIG. 11 is performed simultaneously with the step shown in FIG. 10 while a coil plating seed film remains. As shown in FIG. 11, each hole portion 75c reaching the end portion in the track-width direction of the above-described first coil piece 55 is provided by the exposure phenomenon in the above-described resist layer 75, and the top surface of the end portion in the track-width direction of the above-described first coil piece 55 is exposed at the above-described hole portion 75c.

The connection layers 61 are provided by plating in the hole portions 75c shown in FIG. 11 through the use of Cu, Au, Ni, Cu/Ni, or NiFe. Subsequently, the coil plating seed film is removed.

In this manner, the above-described protuberance layer 32, the back gap layer 33, and the connection layers 61 can be formed through the use of the coil plating seed film by the steps shown in FIG. 10 and FIG. 11. Consequently, the speedup of the manufacturing process can be achieved, and the formation of the above-described connection layers 61 can be facilitated. The above-described connection layers 61 may be formed by another step before or after the above-described protuberance layer 32 and the back gap layer 33 are formed.

The resist layer 75 is removed. In the step shown in FIG. 12, the above-described first coil pieces 55, the above-described protuberance layer 32, and the back gap layer 33 are covered with the coil insulating layer 36 made of $Al_2O_3$ or the like. The above-described coil insulating layer 36 is formed by sputtering or the like. At this time, as shown in FIG. 13, the connection layers 61 provided on the end portions in the track-width direction of the above-described first coil pieces 55 are also covered with the above-described coil insulating layer 36.

Figure 12:
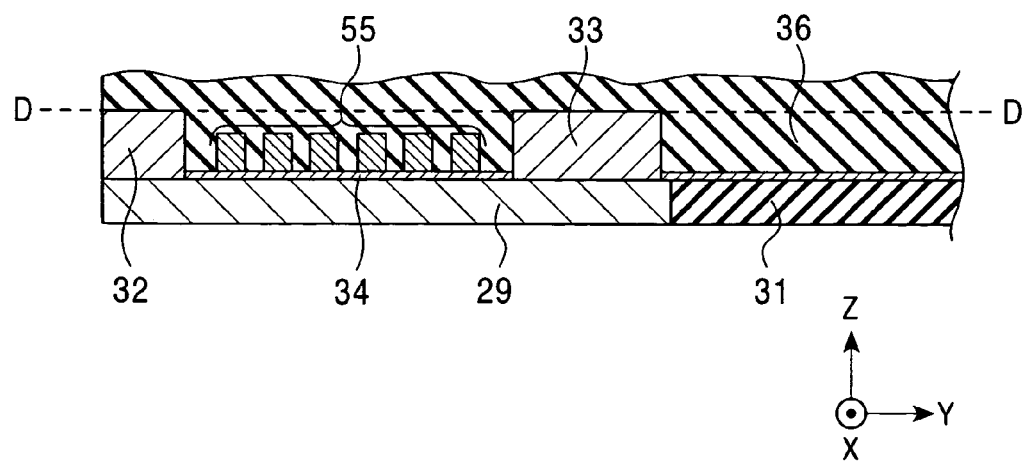
FIG. 12 is a diagram showing a step performed following the step shown in FIG. 10.
Figure 13:
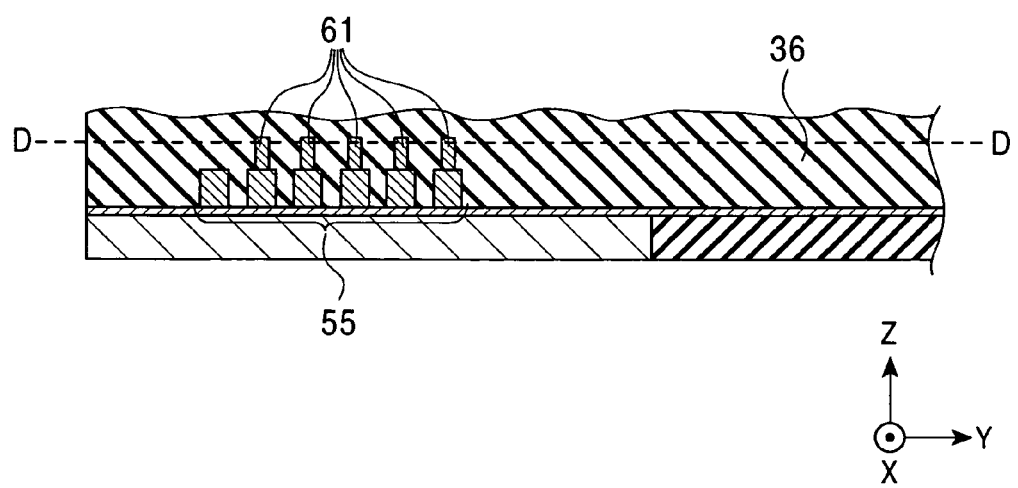
FIG. 13 is a diagram showing a step performed simultaneously with the step shown in FIG. 12.
Figure 14:
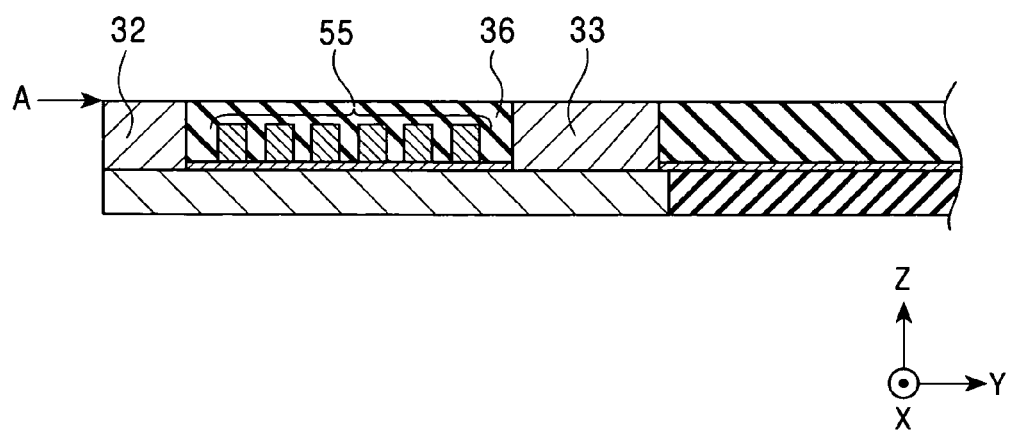
FIG. 14 is a diagram showing a step performed following the step shown in FIG. 12.

The above-described coil insulating layer 36, the protuberance layer 32, the back gap layer 33, and the connection layers 61 are cut up to a line D—D shown in FIG. 12 and FIG. 13 from the direction parallel to the X-Y plane by using a CMP technology or the like. FIG. 14 shows the condition in which the cutting is completed.

In FIG. 14, the top surface of the protuberance layer 32, the top surface of the coil insulating layer 36, the top surface of the back gap layer 33, and the top surfaces of the above-described connection layers 61 not shown in the drawing are provided as a flattened surface along the reference surface A. As shown in FIG. 14, the first coil pieces 55 are in the condition of being completely covered with the above-described coil insulating layer 36. In order to appropriately perform the above-described polishing, the above-described coil insulating layer 36 must be formed from an inorganic insulating material, e.g., $Al_2O_3$. For example, in the case where the above-described coil insulating layer 36 is formed from an organic insulating material, appropriate cutting cannot be performed by even the above-described polishing because of stickiness of the above-described organic insulating material and, therefore, it is difficult to flatten.

Figure 15:
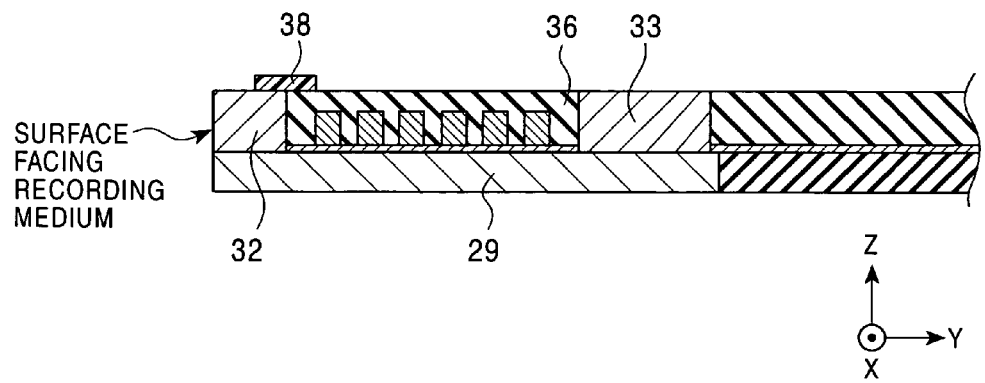
FIG. 15 is a diagram showing a step performed following the step shown in FIG. 14.

In the step shown in FIG. 15, the Gd-determining layer 38 is formed in the location at a predetermined distance in the height direction (the Y direction shown in the drawing) from the surface facing the recording medium. The above-described Gd-determining layer 38 is formed from an inorganic insulating material or an organic insulating material.

Figure 16:
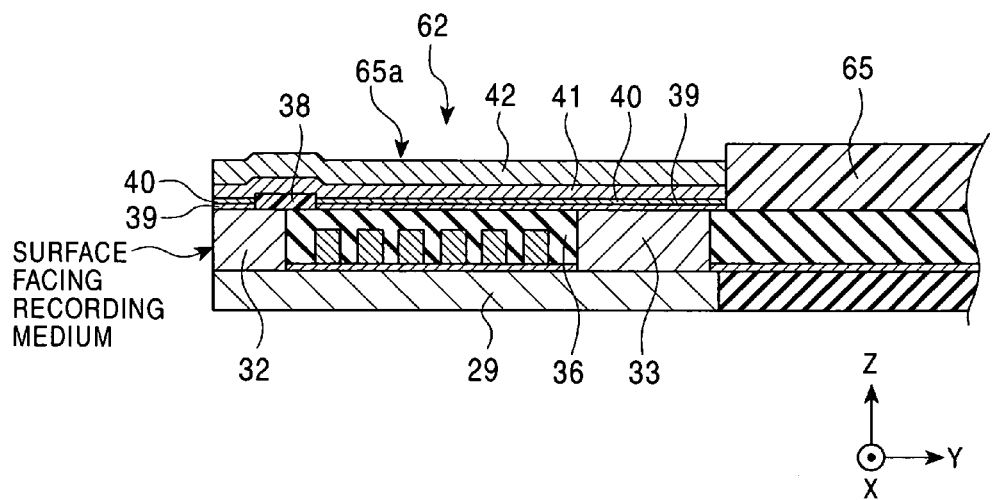
FIG. 16 is a diagram showing a step performed following the step shown in FIG. 15.

In the step shown in FIG. 16, the plating seed film (not shown in the drawing) required for plating is formed from a NiFe alloy, a FeCo alloy, or the like. Subsequently, a resist layer 65 provided with a pattern 65a having, for example, a two-dimensional shape composed of the front-end portion B and the rear-end portion C shown in FIG. 4 is formed, and the lower magnetic pole layer 39, the gap layer 40, the upper magnetic pole layer 41, and the upper core layer 42 are continuously formed by plating in that order from the bottom in this pattern 65a.

The two-dimensional shape of each of the above-described lower magnetic pole layer 39, the gap layer 40, the upper magnetic pole layer 41, and the upper core layer 42 is composed of the front-end portion B and the rear-end portion C. The front-end portion B has a slim shape from the surface facing the recording medium toward the height direction (the Y direction shown in the drawing), and the rear-end portion C has the width in the track-width direction (the X direction shown in the drawing) increasing from both base ends BI of the front-end portion B toward the height direction. At this time, the track width Tw is regulated by the width dimension in the track-width direction (the X direction shown in the drawing) of the above-described upper magnetic pole layer 41 in the above-described facing-surface. Subsequently, the above-described resist layer 65 is removed.

The step shown in FIG. 16 has the effect that the laminate 62 composed of the above-described lower magnetic pole layer 39, the gap layer 40, the upper magnetic pole layer 41, and the upper core layer 42 can be formed on the flattened coil insulating layer 36, protuberance layer 32, and back gap layer 33. That is, the above-described laminate 62 can be highly precisely formed into a predetermined shape on the above-described coil insulating layer 36, the protuberance layer 32, and the back gap layer 33 and, thereby, the above-described track width Tw can have a predetermined dimension.

Following the completion of the step shown in FIG. 16, the insulating layers 58 and 63 shown in FIG. 2 are formed, and hole portions are formed in the insulating layer 63 formed from an organic insulating material by the exposure phenomenon, so that the top surfaces 61a of the above-described connection layers 61 are exposed at the above-described hole portions. Subsequently, the second coil pieces 56 are formed by patterning over the above-described insulating layers 58 and 63 and the top surfaces 61a of the above-described connection layers 61. The above-described second coil pieces 56 are formed by plating from a non-magnetic conductive material, for example, Cu. A plurality of second coil pieces 56 parallel to each other are provided while being non-parallel to the above-described first coil pieces 55. Each of the above-described second coil pieces 56 is extended in the direction parallel to the track-width direction (the X direction shown in the drawing), or is extended in the track-width direction while being inclined toward the height direction (the Y direction shown in the drawing).

According to the above-described manufacturing method, the top surfaces of the coil insulating layer 36, the protuberance layer 32, the back gap layer 33, and the connection layers 61 are provided as the same flattened surface along the reference surface A by using the CMP technology or the like in the steps shown in FIG. 12 and FIG. 13. Consequently, the top surfaces 61a of the above-described connection layers 61 are in the condition of being exposed at the above-described flattened surface and, thereby, the end portions 56a and 56b in the track-width direction (the X direction shown in the drawing) of the above-described second coil pieces 56 are reliably, easily connected to the top surfaces 61a of the above-described connection layers 61.

Figure 17:
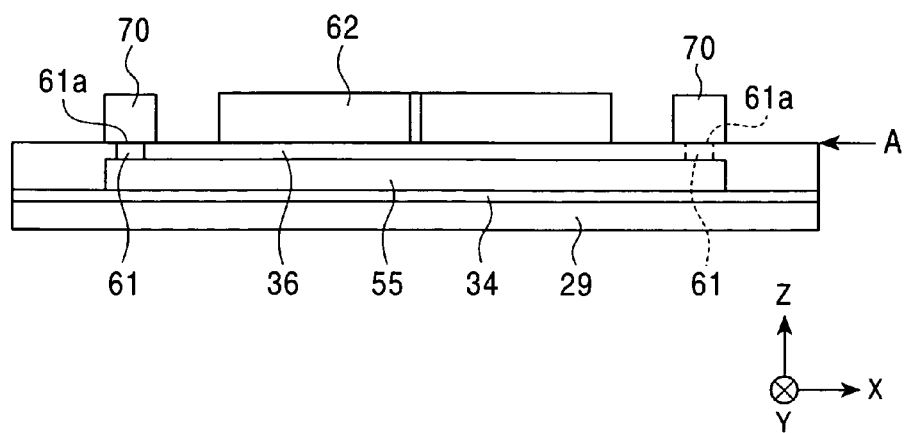
FIG. 17 is a diagram showing a step of a method for manufacturing the thin film magnetic head shown in FIG. 6 according to the present invention.
Figure 18:
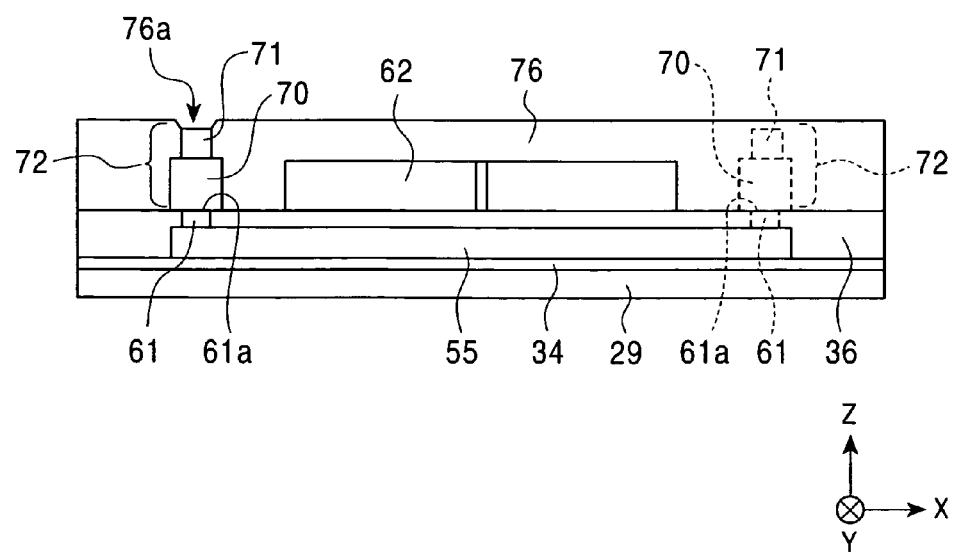
FIG. 18 is a diagram showing a step performed following the step shown in FIG. 17.
Figure 19:
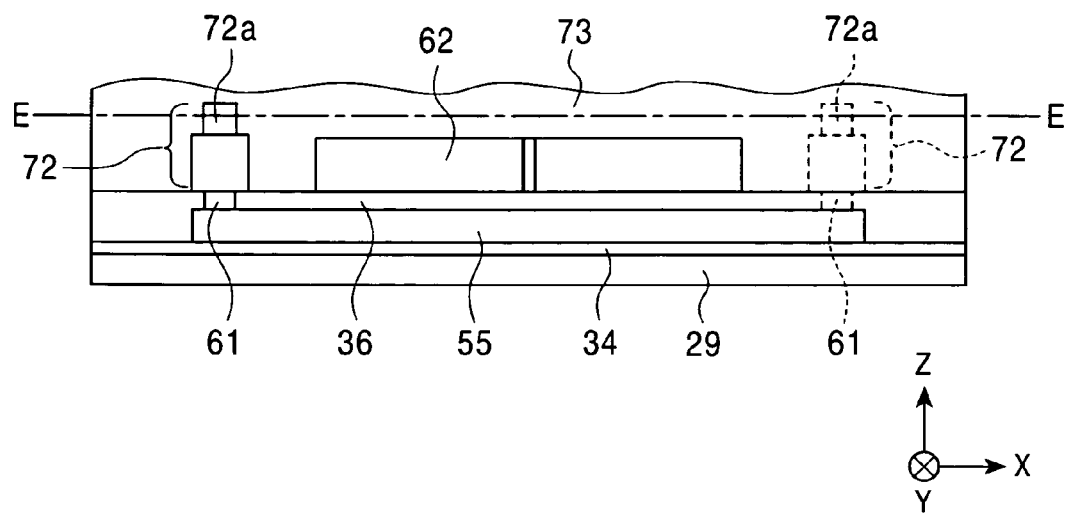
FIG. 19 is a diagram showing a step performed following the step shown in FIG. 18.

Each of FIG. 17 to FIG. 19 is a diagram showing a step of a method for manufacturing the thin film magnetic head shown in FIG. 6, and is a partial front view wherein the protuberance layer 32 and the like are not shown in the drawing.

The manufacturing steps up to the reference surface A are as described above. In the step shown in FIG. 17, the laminate 62 is formed by plating on the top surface of the coil insulating layer 36, the top surface of the protuberance layer 32, and the top surface of the back gap layer 33 while each top surface is flattened, and the first lifting layers 70 are simultaneously formed by plating from the same material on the top surfaces 61a of the connection layers 61 exposed at the above-described reference surface A. Although not shown in FIG. 17, hole portions for forming the above-described first lifting layers 70 are formed by the exposure phenomenon in the resist layer 65 provided in the step shown in FIG. 16, and the above-described first lifting layers 70 are formed by plating in the resulting hole portions.

The above-described resist layer 65 is removed, and another resist layer 76 is applied onto the above-described laminate 62, the coil insulating layer 36, and the first lifting layers 70. Subsequently, hole portions 76a penetrating up to the top surfaces of the above-described first lifting layers 70 are provided in the above-described resist layer 76 by the exposure phenomenon, and the second lifting layers 71 are formed by plating in the resulting hole portions.

The first lifting layer 70 may not be formed in the step shown in FIG. 17, hole portions penetrating up to the top surfaces 61a of the above-described connection layers (lower connection layers) 61 may be provided in the above-described resist layer 76 in the step shown in FIG. 18, and a single layer of the upper connection layer 72 may be formed by plating in each of the resulting hole portions. In such a case, the partial front view of the completed thin film magnetic head is the same as FIG. 7.

At least the top surfaces of the above-described upper connection layers 72 must be provided at the location higher than the top surface of the above-described laminate 62.

The resist layer 76 shown in FIG. 18 is removed. In the step shown in FIG. 19, the top surface of the above-described laminate 62, the top surface of the coil insulating layer 36, and the top surfaces of the upper connection layers 72 are covered with the insulating layer 73 made of an inorganic insulating material, e.g., Al$_2$O$_3$, the above-described insulating layer 73 and the upper connection layers 72 are cut up to a line E—E shown in the drawing by using a CMP technology or the like, so that the top surface of the above-described insulating layer 73 and the top surfaces of the upper connection layers 72 are processed into the same flattened surface. The top surface of the above-described laminate 62 must not be exposed by this polishing step. In order to appropriately perform the above-described polishing, the above-described insulating layer 73 must be formed from an inorganic insulating material, e.g., Al$_2$O$_3$. For example, in the case where the above-described insulating layer 73 is formed from an organic insulating material, appropriate cutting cannot be performed by even the above-described polishing because of stickiness of the above-described organic insulating material and, therefore, it is difficult to flatten.

In the step shown in FIG. 19, the above-described laminate 62 becomes in the condition of being completely covered with the above-described insulating layer 73 and, in addition, the top surfaces 72a of the above-described upper connection layers 72 are exposed at surfaces flush with the flattened surface of the above-described insulating layer 73.

The above-described second coil pieces 56 are formed by patterning on the above-described insulating layer 73 and the top surfaces 72a of the above-described upper connection layers 72. The insulating layer 73 covering the above-described laminate 62 is provided as a flattened surface in the step shown in FIG. 19 and, thereby, the above-described second coil pieces 56 provided thereon can be formed on the flattened surface. Consequently, the above-described second coil piece 56 can be formed into a predetermined shape. Furthermore, the top surfaces 72a of the upper connection layers 72 are exposed at the same surface as the above-described insulating layer 73 and, thereby, the end portions in the track-width direction of the above-described second coil pieces 56 can be provided on the top surfaces 72a of the above-described upper connection layers 72 without bending the end portions in the track-width direction of the above-described second coil pieces 56, in contrast to the manner shown in FIG. 2 and FIG. 5. Consequently, the end portions in the track-width direction of the above-described second coil pieces 56 can be electrically connected to the top surfaces 72a of the above-described upper connection layers 72 with further reliability and with ease.

Figure 20:
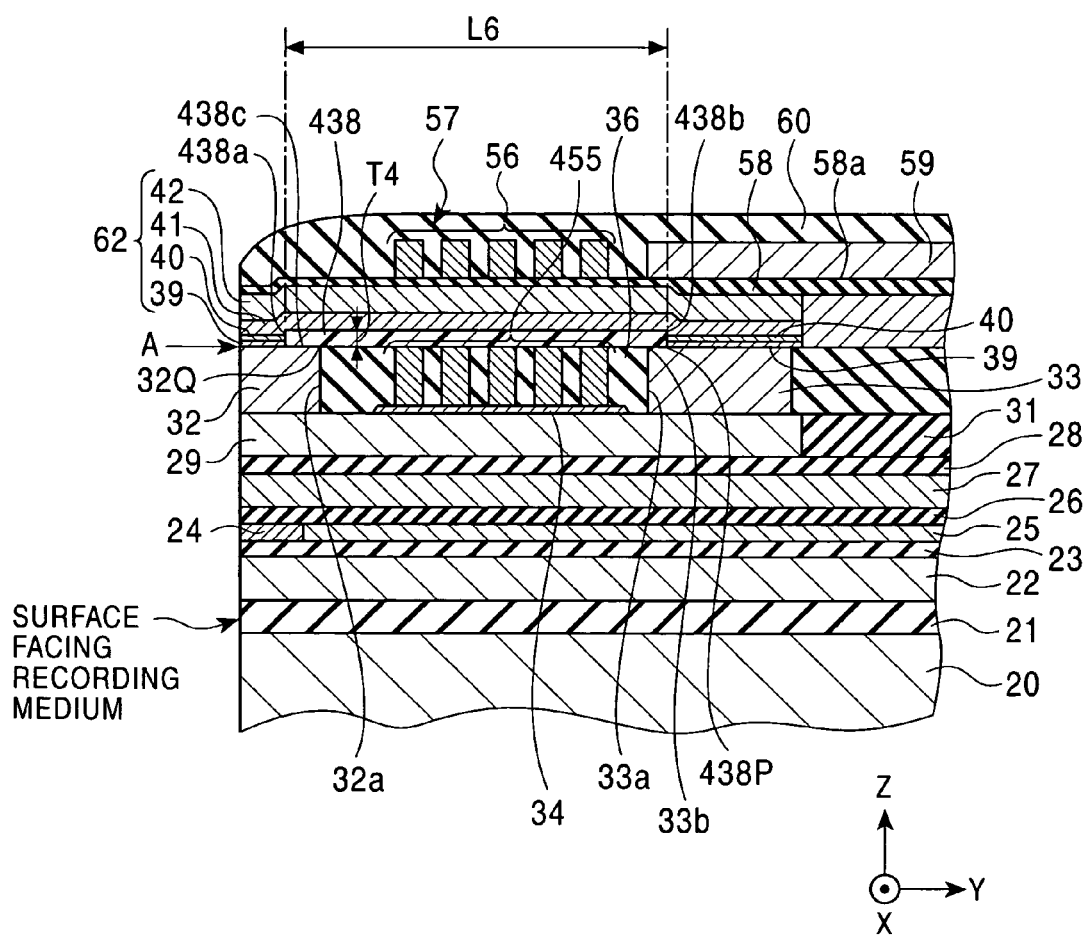
FIG. 20 is a vertical sectional view showing the structure of a thin film magnetic head according to a fifth embodiment of the present invention.

FIG. 20 is a partial vertical sectional view showing the structure of a thin film magnetic head according to the fifth embodiment of the present invention. The thin film magnetic head shown in FIG. 20 has substantially the same structure as that of the thin film magnetic head shown in FIG. 1. Therefore, constituents of the thin film magnetic head shown in FIG. 20 similar to those of the thin film magnetic head shown in FIG. 1 are indicated by the same reference numerals as in FIG. 1, and detailed explanations thereof will not be provided.

In the thin film magnetic head shown in FIG. 20, the top surfaces of first coil pieces 455 are flush with a reference surface A, and the top surface of a protuberance layer 32, the top surfaces of the first coil pieces 455, the top surface of a coil insulating layer 36, and the top surface of a back gap layer 33 are a continuous flattened surface along the above-described reference surface A.

A Gd-determining layer 438 is provided from the location at a predetermined distance in the height direction (the Y direction shown in the drawing) from the surface facing the recording medium toward the height direction. The front end surface 438a of the above-described Gd-determining layer 438 is located on the above-described protuberance layer 32, as in the thin film magnetic head shown in FIG. 1, and the rear end surface 438b of the above-described Gd-determining layer 438 is located on the above-described back gap layer 33. Alternatively, the rear end surface 438b of the above-described Gd-determining layer 438 may be located on the boundary portion 33b between the top surface of the above-described back gap layer 33 and a front-end portion 33a.

In the thin film magnetic head shown in FIG. 20, the above-described Gd-determining layer 438 is provided on the first coil pieces 455, and this Gd-determining layer 438 is formed from an organic insulating material or an inorganic insulating material. Consequently, even if the top surfaces of the first coil pieces 455 are extended to the above-described reference surface A and, therefore, are in contact with the bottom surface of the Gd-determining layer 438, the first coil pieces 455 can be insulated from the laminate 62. Therefore, the cross-sectional area of the first coil pieces 455 can be increased, and the resistance can be reduced.

Figure 21:
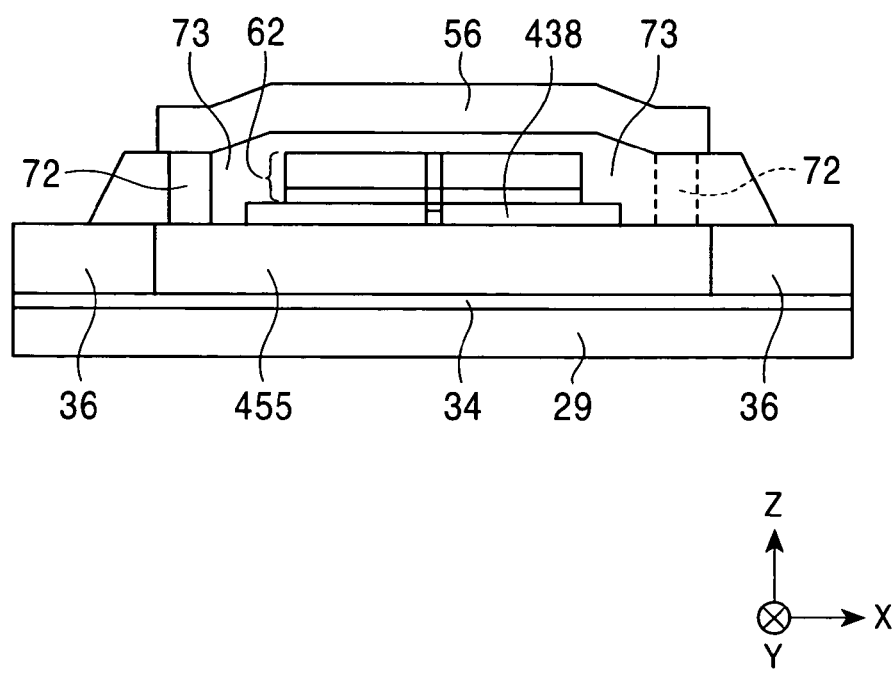
FIG. 21 is a partial front view showing the structure of the thin film magnetic head according to the fifth embodiment of the present invention.

FIG. 21 is a front view of the thin film magnetic head shown in FIG. 20, viewed from the side of the surface facing the recording medium. This front view is similar to the front view of the thin film magnetic head shown in FIG. 7. In FIG. 21, the above-described protuberance layer 32 is not shown in the drawing, but the first coil piece 455 located rearward of the above-described protuberance layer 32 is shown in the drawing.

In the present embodiment, the top surfaces of the first coil pieces 455 are located on the flattened surface along the above-described reference surface A while the flattened surface is flush with the top surface of the protuberance layer 32, the top surface of the coil insulating layer 36, and the top surface of the back gap layer 33 and, thereby, the first coil pieces 455 can be directly connected to the upper connection layers 72. Therefore, the connection layers 61 for connecting the first coil pieces 34 to the upper connection layers 72 may become unnecessary and the number of connection portions is decreased in the thin film magnetic head shown in FIG. 7, so that the value of resistance of the total coil layer is decreased. Consequently, the amount of heat generation is decreased, the amount of thermal expansion and the amount of protrusion of the surface facing the recording medium of the thin film magnetic head can be decreased, and a magnetic head having a small amount of floating can be provided.

In FIG. 21, the shape of the upper connection layer 72 is similar to that of the thin film magnetic head shown in FIG. 7. However, the upper connection layer 72 may be similar to that of the thin film magnetic head shown in FIG. 6. The first coil pieces 455 may be directly connected to the second coil pieces 56 without provision of the upper connection layers 72.

The coil layer of the present invention is not limited to that shown in FIG. 3 in which a plurality of first coil pieces 55 are parallel to each other, and a plurality of second coil pieces 56 are also parallel to each other.

That is, in the present invention, it is essential only that the first coil pieces extending in the direction intersecting the laminate 62 are provided in the space enclosed with the lower core layer 29, the protuberance layer 32, and the back gap layer 33, the second coil pieces are provided while crossing over the laminate 62, end portions of the above-described first coil pieces adjacent to each other are connected via the second coil pieces and, thereby, the above-described coil layer wound in a toroidal shape is provided.

FIG. 22 to FIG. 26 are plan views showing the two-dimensional structures of first coil pieces and second coil pieces capable of being applied to the thin film magnetic head of the present invention.

Figure 22:
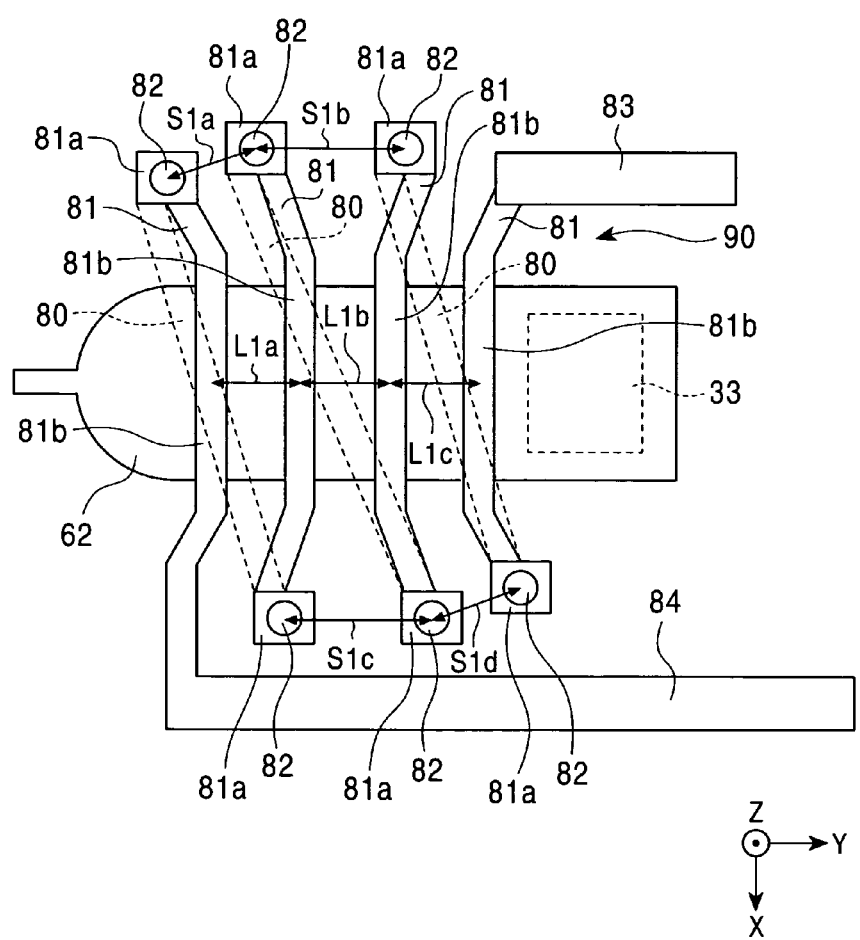
FIG. 22 is a partial plan view showing a coil shape of a coil layer of a thin film magnetic head of the present invention.

FIG. 22 simply shows a laminate 62 and a coil layer 90 of a thin film magnetic head. The thin film magnetic head shown in FIG. 22 has substantially the same structure as that of the thin film magnetic head shown in FIG. 1 except that only the coil layer has a different structure.

That is, the plurality of first coil pieces 80 constituting the coil layer 90 of the thin film magnetic head shown in FIG. 22 are not parallel to each other. With respect to the plurality of second coil pieces 81, the portions 81b overlapping the laminate 62 are parallel to each other, but the distance in the height direction (the Y direction shown in the drawing) between portions in both sides in the track-width direction (the X direction shown in the drawing) of the laminate 62 increases with increasing proximity to the end portions 81a.

In FIG. 22, the above-described first coil pieces 80 provided under the laminate 62 are indicated by dotted lines, and the above-described second coil pieces 81 provided above the laminate 62 are indicated by solid lines.

In a manner similar to that in the structure shown in FIG. 2 to FIG. 4, electrically conductive lifting layers 82 are connected to the end portions 81a in the track-width direction (the X direction shown in the drawing) of the above-described second coil pieces 81, and the lifting layers 82 are electrically connected to the end portions of the above-described first coil pieces 80. The end portions of the above-described first coil pieces 80 are provided at the locations overlapping the end portions 81a of the above-described second coil pieces 81, although not shown in FIG. 22. The lifting layer 82 has a structure similar to that of the upper connection layer 72 shown in FIG. 2, and is in the condition of being connected to the end portion of the above-described first coil piece 80 via a connection layer similar to the above-described connection layer 61. The coil layer 90 shown in FIG. 22 also has a toroidal structure wound around the laminate 62. Reference numerals 83 and 84 denote lead layers for connecting both end portions of the coil layer 90 to electrode layers.

In FIG. 22, for example, the distance S1a between the end portion 81a of the leftmost second coil piece 81 in the drawing and the end portion 81a of the second coil piece 81 on the right side thereof is larger than a minimum distance L1a between the above-described second coil pieces in the region overlapping the above-described laminate 62.

The distances S1b and S1c between the end portions 81a of the second coil piece 81 which is the second from the left in the drawing and the end portions 81a of the second coil piece 81 on the right side thereof are larger than a minimum distance L1b between the above-described second coil pieces in the region overlapping the above-described laminate 62. The distance S1d between the end portion 81a of the rightmost second coil piece 81 in the drawing and the end portion 81a of the second coil piece 81 on the left side thereof is larger than a minimum distance L1c between these second coil pieces in the region overlapping the above-described laminate 62.

In the above description, the distance between the end portion 81a and another end portion 81a refers to the distance between the center of the end portion 81a and the center of the other end portion 81a. The minimum distance between the above-described second coil pieces in the region overlapping the above-described laminate 62 refers to a minimum distance between straight lines dividing the above-described respective second coil pieces into equal parts in the width direction.

With respect to an inductive thin film magnetic head, preferably, the volume of a magnetic circuit for flowing a magnetic flux is reduced and, thereby, inductance is reduced. Consequently, the length in the height direction of the above-described laminate 62 must be decreased, and the distances L1a, L1b, and L1c between the above-described second coil pieces 81 in the region overlapping the above-described laminate 62 are also decreased. At this time, by increasing the distance between the end portion 81a of the above-described second coil piece 81 and the end portion 81a of another second coil piece 81 adjacent to each other in the height direction, as in the present invention, the end portions 81a are easily formed, and the end portions of the above-described first coil pieces 80 and the end portions 81a of the second coil pieces 81 can be easily, reliably connected.

The above-described plurality of second coil pieces 81 include portions 81b parallel to each other in the region overlapping the above-described laminate 62, and the portions 81b extend in the track-width direction shown in the drawing. Consequently, the magnetic field induced from the above-described coil layer 90 to the above-described laminate 62 is stabilized.

In the structure of the coil layer 90 shown in FIG. 22, the above-described plurality of second coil pieces 81 are parallel to each other all over the region overlapping the above-described laminate 62. However, even the above-described plurality of second coil pieces 81 including portions 81b parallel to each other in a part of the region overlapping the above-described laminate 62, as shown in FIG. 23, can exert the effect of stabilizing the magnetic field induced from the above-described coil layer 90 to the above-described laminate 62.

In the present invention, it is only essential that, with respect to at least one pair of the above-described second coil pieces 81, the distance between the end portion 81a and another end portion 81a adjacent to each other in the height direction is larger than a minimum distance between the above-described second coil pieces 81 in the region overlapping the above-described laminate 62.

Figure 24:
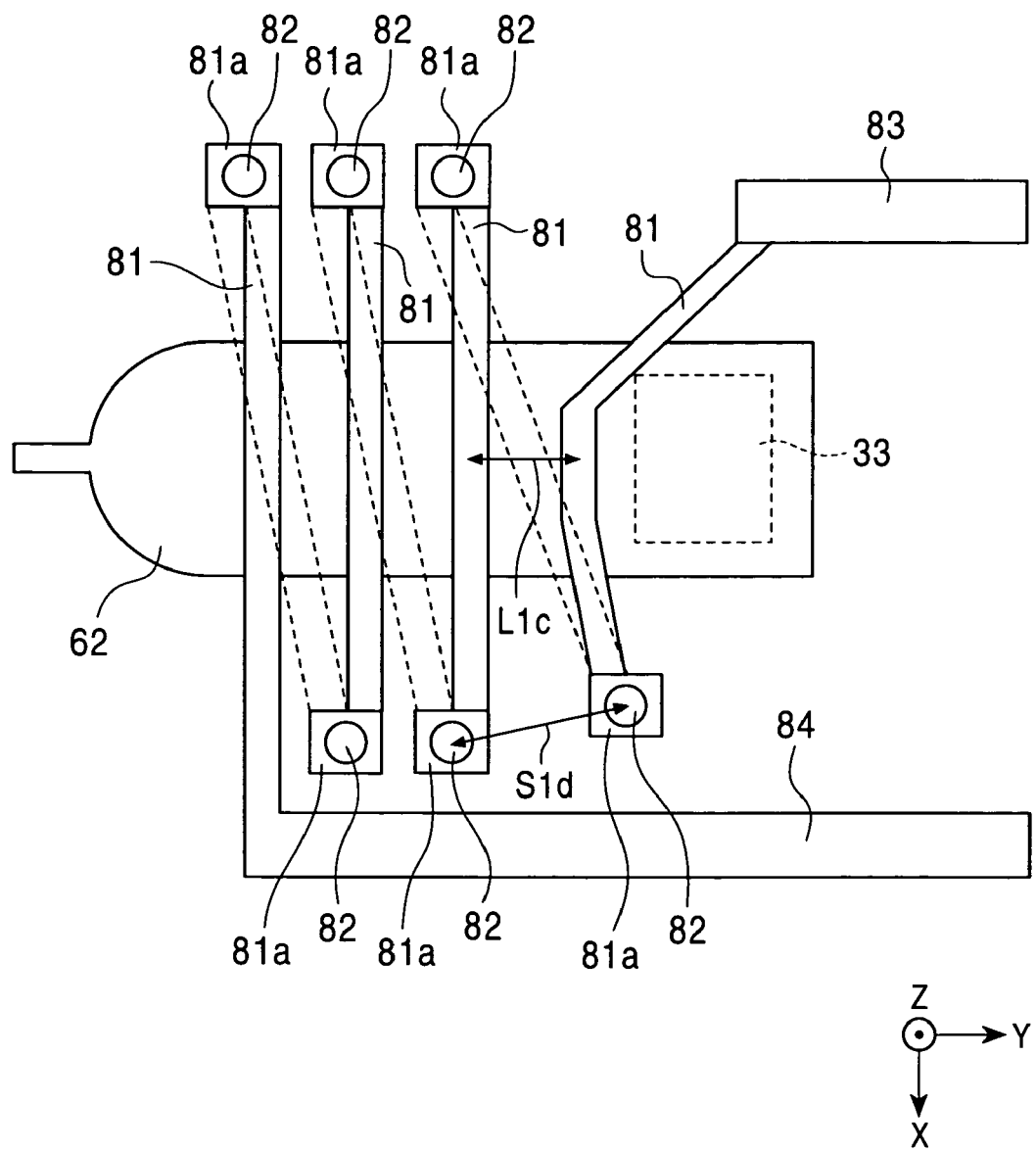
FIG. 24 is a partial plan view showing a coil shape of a coil layer of a thin film magnetic head of the present invention.

For example, the structure of the coil layer shown in FIG. 24 is also included within the scope of the present invention. In FIG. 24, only the distance S1d between the end portion 81a of the rightmost second coil piece 81 in the drawing and the end portion 81a of the second coil piece 81 on the left side thereof is larger than a minimum distance L1c between the above-described second coil pieces 81 in the region overlapping the above-described laminate 62. However, with respect to each of other combinations of the above-described second coil pieces 81, the distance between the end portion 81a and another end portion 81a adjacent to each other in the height direction is equal to the minimum distance between the above-described second coil pieces 81 in the region overlapping the above-described laminate 62.

Figure 23:
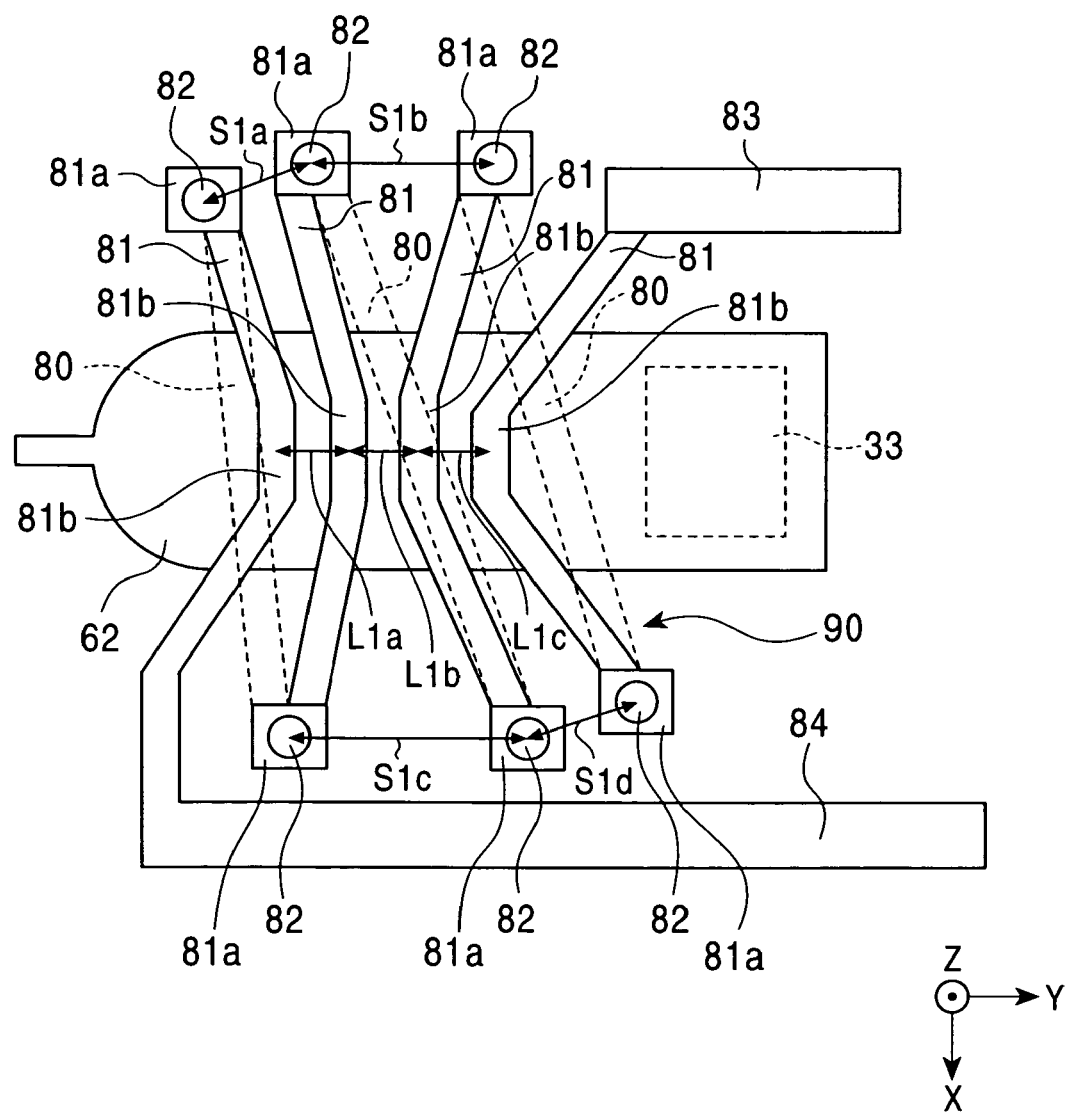
FIG. 23 is a partial plan view showing a coil shape of a coil layer of a thin film magnetic head of the present invention.

In the description with respect to FIG. 22 to FIG. 24, the distance between the above-described second coil pieces 81 is increased from the region overlapping the above-described laminate 62 toward the end portions 81a. A similar configuration can also be applied to the above-described first coil pieces 80.

Figure 25:
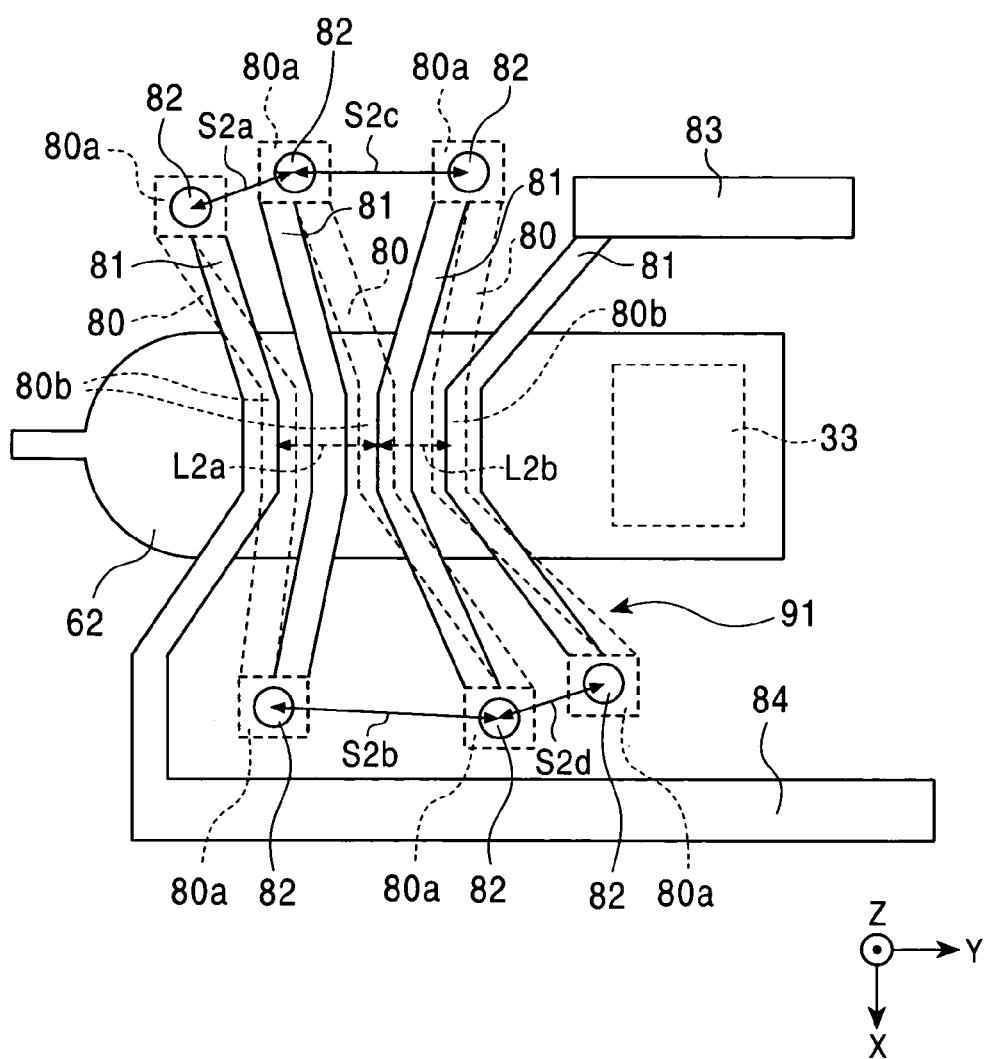
FIG. 25 is a partial plan view showing a coil shape of a coil layer of a thin film magnetic head of the present invention.

FIG. 25 shows a coil layer 91 having a configuration in which the distance between the above-described first coil pieces 80 is also increased from the region overlapping the above-described laminate 62 toward the end portions of the above-described first coil pieces 80.

The structure of second coil pieces 81 of the coil layer 91 shown in FIG. 25 is the same as the structure of the second coil pieces 81 of the coil layer 90 shown in FIG. 23. FIG. 25 shows the end portions 80a of the first coil pieces 80 which are not shown in FIG. 23, but the end portions 81a of the second coil pieces 81 are not shown in the drawing.

In FIG. 25, for example, the distances S2a and S2b between the end portion 80a of the leftmost first coil piece 80 in the drawing and the end portion 80a of the first coil piece 80 on the right side thereof (center) are larger than a minimum distance L2a between the above-described first coil pieces in the region overlapping the above-described laminate 62.

The distances S2c and S2d between the end portion 80a of the first coil piece 80 which is the second from the left (center) in the drawing and the end portion 80a of the first coil piece 80 on the right side thereof (rightmost) are larger than a minimum distance L2b between the above-described first coil pieces in the region overlapping the above-described laminate 62.

In the above description as well, the distance between the end portion 80a and another end portion 80a refers to the distance between the center of the end portion 80a and the center of the other end portion 80a. The minimum distance between the above-described first coil pieces in the region overlapping the above-described laminate 62 refers to a minimum distance between straight lines dividing the above-described respective first coil pieces into equal parts in the width direction.

The above-described plurality of first coil pieces 80 include portions 80b parallel to each other in the region overlapping the above-described laminate 62, and the portions 80b extend in the track-width direction shown in the drawing. Consequently, the magnetic field induced from the above-described coil layer 91 to the above-described laminate 62 is stabilized.

The structure of the first coil pieces 80 may be different from that shown in FIG. 25. For example, the first coil pieces 80 may have a shape similar to the structure of the second coil pieces 81 shown in FIG. 22 or FIG. 24.

A coil layer in which only the first coil pieces 80 have the structure of the present invention, that is, the distance between at least one combination of the above-described first coil pieces 80 is increased from the region overlapping the above-described laminate 62 toward the end portions of the above-described first coil pieces 80, is included within the scope of the present invention.

Figure 26:
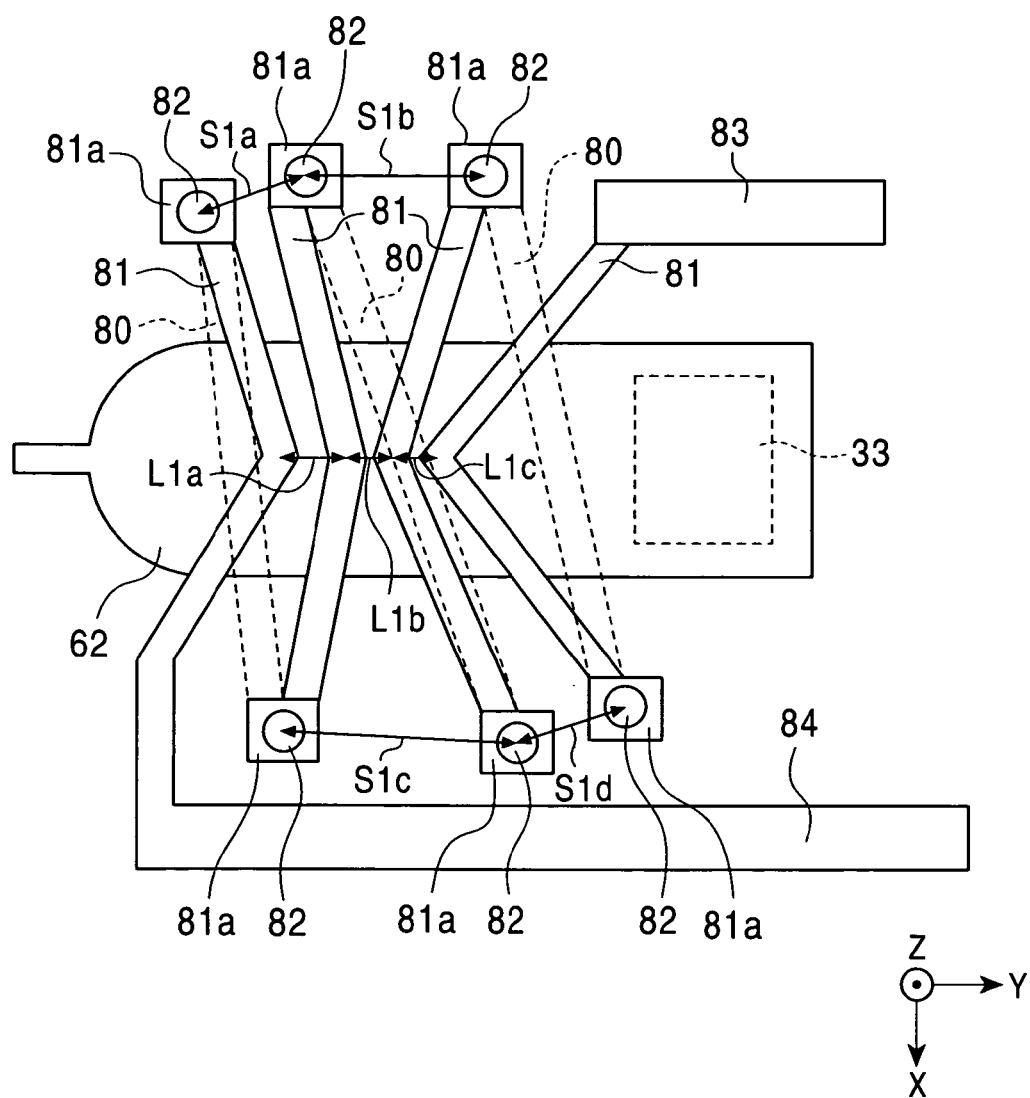
FIG. 26 is a partial plan view showing a coil shape of a coil layer of a thin film magnetic head of the present invention.

The portions parallel to each other may not be provided in the region overlapping the above-described laminate 62, as that in a coil layer 92 shown in FIG. 26.

Figure 27:
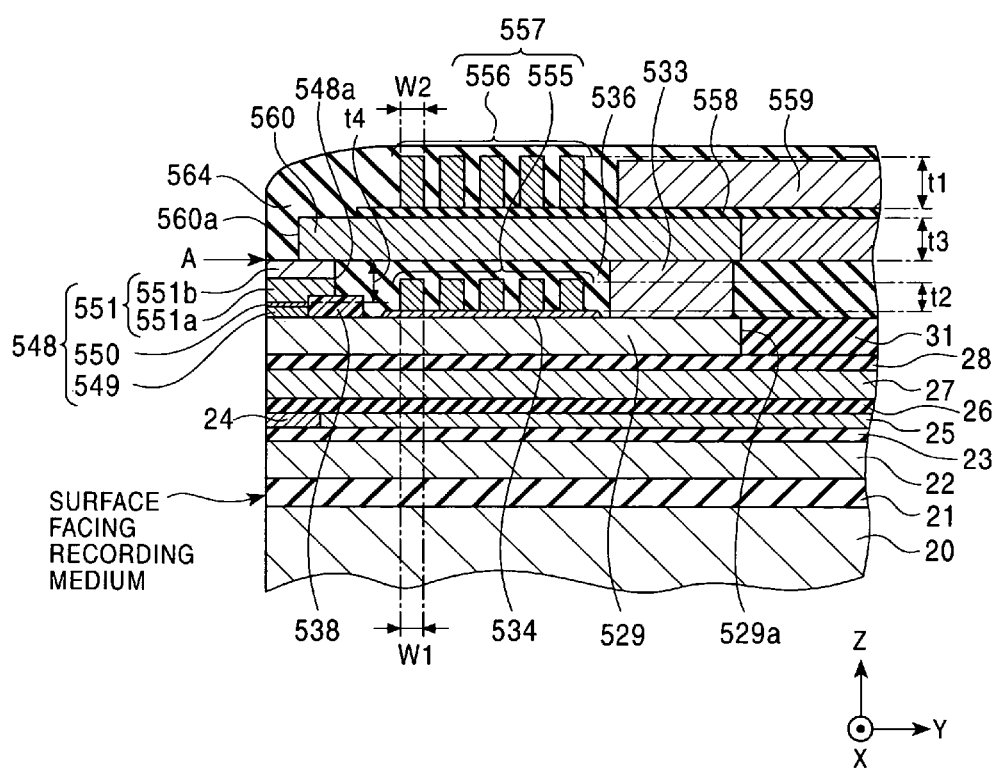
FIG. 27 is a partial vertical sectional view showing the structure of a thin film magnetic head according to a sixth embodiment of the present invention.
Figure 28:
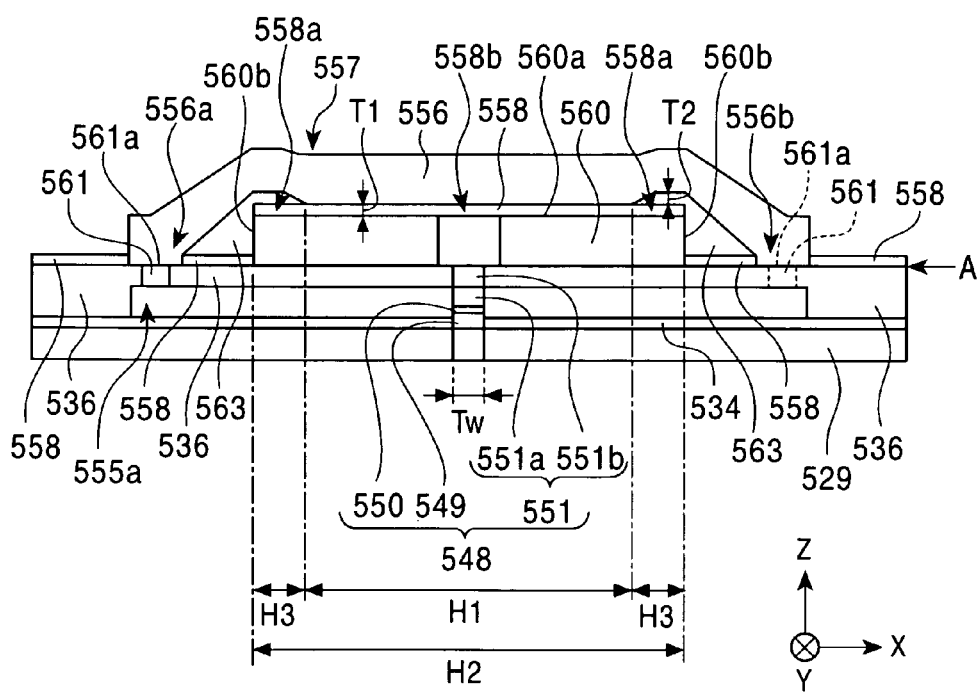
FIG. 28 is a partial front view of the thin film magnetic head shown in FIG. 27.

FIG. 27 is a partial vertical sectional view showing the structure of a thin film magnetic head according to the sixth embodiment of the present invention. FIG. 28 is a partial front view of the thin film magnetic head shown in FIG. 27 wherein an MR head, an insulating layer 536, a protective layer 564, and the like are not shown in the drawing, and a structure composed of a magnetic pole end layer, a first coil piece and a second coil piece provided at the locations closest to a surface facing a recording medium, and each layer facing these layers in the film thickness direction is viewed from the side of the surface facing the recording medium.

A playback head (may be referred to as an MR head) from the above-described lower shield layer 22 to the above-described upper shield layer 27 is the same as that in the thin film magnetic head according to any one of the first embodiment to the fifth embodiment.

As shown in FIG. 27, a separation layer 28 formed from $Al_2O_3$ or the like is provided on the above-described upper shield layer 27. The above-described upper shield layer 27 and the separation layer 28 may not be provided, and a following lower core layer 529 may be provided on the above-described upper gap layer 26. In such a case, the above-described lower core layer 529 doubles as the upper shield layer.

In FIG. 27, the lower core layer 529 is provided on the above-described separation layer 28. The above-described lower core layer 529 is formed from a magnetic material, e.g., a NiFe-based alloy. The above-described lower core layer 529 has a predetermined length dimension in the height direction (the Y direction shown in the drawing) from the surface facing the recording medium. A non-magnetic insulating material layer 31 is provided at the rear in the height direction of the rear end surface 529*a* of the above-described lower core layer 529 and in both sides of the above-described lower core layer 529 in the track-width direction (the X direction shown in the drawing). As shown in FIG. 27, the surface of each of the above-described lower core layer 529 and the non-magnetic insulating material layer 31 is a continuous flattened surface.

As shown in FIG. 27, a magnetic pole end layer (protuberance layer) 548 having a predetermined length dimension rearward in the height direction from the surface facing the recording medium is provided on the lower core layer 529. The magnetic pole end layer 548 has a width dimension in the track-width direction (the X direction shown in the drawing) of a track width Tw. The track width Tw is, for example, 0.5 $\mu$m or less.

In the embodiment shown in FIG. 28, the magnetic pole end layer 548 is configured to have a three-layer laminated structure composed of a lower magnetic pole layer 549, a gap layer 550, and an upper magnetic pole layer 551. The magnetic pole layers 549 and 551 and the gap layer 550 will be described below.

The lower magnetic pole layer 549 for serving as a lowermost layer of the magnetic pole end layer 548 is provided by plating on the lower core layer 529. The lower magnetic pole layer 549 is formed from a magnetic material, and is magnetically connected to the lower core layer 529. The lower magnetic pole layer 549 may be formed from the same material as that for the lower core layer 529 or from a different material. The lower magnetic pole layer 549 may be composed of a single layer film or a multilayer film.

A non-magnetic gap layer 550 is laminated on the lower magnetic pole layer 549.

Preferably, the gap layer 550 is formed from a non-magnetic metal material, and is provided on the lower magnetic pole layer 549 by plating. Preferably, the non-magnetic metal material is at least one selected from the group consisting of NiP, NiReP, NiPd, NiW, NiMo, NiRh, NiRe, Au, Pt, Rh, Pd, Ru, and Cr. The gap layer 550 may be composed of a single-layer film or a multilayer film.

The upper magnetic pole layer 551 magnetically connected to the upper core layer 560 described below is provided by plating on the gap layer 550. In the present embodiment, the upper magnetic pole layer 551 has a laminated structure composed of a lower layer 551*a* and an upper layer 551*b*. The lower layer 551*a* and the upper layer 551*b* are formed from magnetic materials, and the saturation magnetic flux density of the lower layer 551*a* is larger than the saturation magnetic flux density of the upper layer 551*b*.

When the gap layer 550 is formed from a non-magnetic metal material, as described above, the lower magnetic pole layer 549, the gap layer 550, and the upper magnetic pole layer 551 can be continuously formed by plating.

A back gap layer 533 is provided on the above-described lower core layer 529 while being located at a predetermined distance in the height direction (the Y direction shown in the drawing) from the rear-end surface 548*a* in the height direction of the above-described magnetic pole end layer 548.

The back gap layer 533 is formed from a magnetic material. The back gap layer 533 may be formed from the same material as that for the above-described lower core layer 529, or be formed from a different material. The back gap layer 533 may be a single layer, or may have a multilayer laminated structure. The back gap layer 533 is magnetically connected to the above-described lower core layer 529.

A coil insulating substrate layer 534 is provided between the magnetic pole end layer 548 and the back gap layer 533 on the lower core layer 529, and a plurality of first coil pieces 555 parallel to each other are provided on the above-described coil insulating substrate layer 534 while the first coil pieces 555 are extended parallel to the track-width direction (the X direction shown in the drawing) and are arranged side by side in the height direction. Each of the first coil pieces 555 may be extended in the track-width direction (the X direction shown in the drawing) while being inclined toward the height direction.

The above-described first coil pieces 555 are covered with a coil insulating layer 536 formed from an inorganic insulating material, e.g., $Al_2O_3$. As shown in FIG. 27, the top surface of the above-described magnetic pole end layer 548, the top surface of the coil insulating layer 536, and the top surface of the back gap layer 533 are provided as a continuous flattened surface along a reference surface A shown in FIG. 27.

As shown in FIG. 28, electrically conductive connection layers 561 are provided as protrusions on the end portions 555*a* in the track-width direction (the X direction shown in the drawing) of the above-described first coil pieces 555. The two-dimensional shape (that is, the shape of a surface cut from the direction parallel to the X-Y plane) of the above-described connection layer 561 can be selected from various shapes, e.g., an ellipse, a circle, a square, a rectangle, and a rhombus. Preferably, the above-described connection layer 561 is formed from the same material as that for the back gap layer 533 from the viewpoint of the manufacturing process. However, the material may be different from that for the back gap layer 533. The above-described connection layer 561 may have a single-layer structure or a multilayer laminated structure. The above-described connection layers 561 are in the condition of being electrically connected to the end portions 555*a* of the above-described first coil pieces 555. The term "electrically connected" refers to a condition in which there is electrical continuity between two layers regardless of direct connection or indirect connection. Hereafter the same holds true.

As shown in FIG. 28, the top surfaces 561a of the connection layers 561 provided on the end portions 555a in the track-width direction (the X direction shown in the drawing) of each first coil piece 555 are flush with the above-described reference surface A. That is, with respect to the thin film magnetic head shown in FIG. 27, all of the top surface of the above-described magnetic pole end layer 548, the top surface of the coil insulating layer 536, the top surface of the back gap layer 533, and the top surfaces 561a of the connection layers 561 are provided as the same flattened surface.

As shown in FIG. 27, a Gd-determining layer 538 is provided from the location at a predetermined distance in the height direction (the Y direction shown in the drawing) from the above-described surface facing the recording medium toward the height direction on the lower core layer 529. As shown in FIG. 27, the rear-end portion of the upper magnetic pole layer 551 is provided on the Gd-determining layer 538. A gap depth (Gd) is determined by the length in the height direction (the Y direction shown in the drawing) of the above-described gap layer 550 from the surface facing the recording medium to the above-described Gd-determining layer 538.

An upper core layer (magnetic layer) 560 is provided by plating on the above-described upper magnetic pole layer 551 and the back gap layer 533. The above-described upper core layer 560 connects the height side of the above-described lower core layer 529 and the above-described magnetic pole end layer 548 via the back gap layer 533, and the upper core layer 560 corresponds the magnetic layer of the present invention.

The upper magnetic pole layer 551 and the upper core layer 560 may be formed from the same material. However, preferably, these are formed from different materials. In particular, it is more preferable that the upper core layer 560 has a saturation magnetic flux density lower than that of the upper layer 551b of the above-described upper magnetic pole layer 551. The saturation magnetic flux density of the upper core layer 560 is, for example, 1.4 T to 1.9 T, the saturation magnetic flux densities of the lower layer and the upper layer of the above-described upper magnetic pole layer 551 are, for example, 1.9 T to 2.4 T and 1.4 T to 1.9 T, respectively.

When the saturation magnetic flux density of the above-described upper core layer 560 is lower than the saturation magnetic flux density of the above-described upper magnetic pole layer 551, magnetic recording due to a leak magnetic field from the upper core layer 560 can easily be prevented.

As shown in FIG. 27 and FIG. 28, an insulating layer 558 formed from an insulating material, e.g., $Al_2O_3$, is provided on the above-described upper core layer 560. Preferably, the above-described insulating layer 558 is formed from an inorganic insulating material. This insulating layer 558 is also provided on the coil insulating layer 536 extending in both sides of the above-described upper core layer 560 in the track-width direction (the X direction shown in the drawing). As shown in FIG. 28, insulating layers 563 formed from an organic insulating material, e.g., a resist, are provided over both end portions in the track-width direction (the X direction shown in the drawing) of the above-described insulating layer 558 and both sides in the track-width direction of the above-described upper core layer 560.

The insulating layer 558 formed from the inorganic insulating material is provided by a sputtering method or the like. Since the above-described insulating layer 558 can have a film thickness smaller than that of the insulating layer 563 formed from the organic insulating material, the upper core layer 560 and second coil pieces 556 described below can be brought close to each other, and the magnetization efficiency can be increased. In addition, insulation between the above-described upper core layer 560 and the second coil pieces 556 can be excellently maintained in both sides of the above-described upper core layer 560 in the track-width direction.

As shown in FIG. 27 and FIG. 28, a plurality of second coil pieces 556 parallel to each other are provided on the above-described insulating layers 558 and 563 while being arranged side by side in the height direction. The second coil pieces 556 are extended in the track-width direction (the X direction shown in the drawing) while being inclined toward the height direction (the Y direction shown in the drawing). Each of the second coil pieces 556 may be extended in the direction parallel to the track-width direction (the X direction shown in the drawing).

The above-described first coil pieces 555 and the second coil pieces 556 are non-parallel to each other, and, as shown in FIG. 28, the left end portion 555a in the track-width direction of the first coil piece 555 and the left end portion 556a in the track-width direction of the second coil piece 556 face each other in the film thickness direction (the Z direction shown in the drawing) of the magnetic layer 560, and the left end portion 555a and the left end portion 556a are electrically connected to each other via the connection layer 561. The right connection layer 561 indicated by a dotted line shown in FIG. 28 electrically connects the right end portion of the first coil piece 555 located at the back (the Y direction shown in the drawing) of the first coil piece 555 visible in the drawing and the right end portion 556b of the second coil piece 556 visible in the drawing.

As described above, in the thin film magnetic head shown in FIG. 27 and FIG. 28, the end portion in the track-width direction of the first coil piece 555 and the end portion in the track-width direction of the second coil piece 556 facing one above the other in the film thickness direction of the above-described magnetic layer 560 are electrically connected to each other via the connection layer 561 and, thereby, a toroidal coil structure 557 is provided.

A layer denoted by reference numeral 564 shown in FIG. 27 is a protective layer formed from $Al_2O_3$ or the like, and a layer denoted by reference numeral 559 shown in FIG. 27 is a lead layer. The above-described lead layer 559 is integrally formed with the second coil piece 556 located at the front end in the height direction.

When a recording current is applied to the coil layer 557, a recording magnetic field is induced in the lower core layer 529 and the upper core layer 560, a leakage magnetic field is generated between the lower magnetic pole layer 549 and the upper magnetic pole layer 551 facing each other with the gap layer 550, and a magnetic signal is recorded on the recording medium, e.g., hard disk, due to this leakage magnetic field.

In the thin film magnetic head shown in FIG. 27, the plurality of first coil pieces 555 are provided in the space enclosed with the above-described lower core layer 529, the magnetic pole end layer 548, and the back gap layer 533. The space in which the above-described first coil pieces 555 can be provided is appropriately formed by protruding the magnetic pole end layer 548 and the back gap layer 533 on the above-described lower core layer 529. In particular, since the above-described magnetic pole end layer 548 and the back gap layer 533 are provided by plating, the above-described magnetic pole end layer 548 and the back gap layer 533 having large thicknesses can be formed. Consequently, the space enclosed with the above-described lower core layer 529, the magnetic pole end layer 548, and the back gap layer 533 is allowed to become wide, and the above-described first coil pieces 555 having predetermined film thicknesses are easily provided.

The connection layers 561 are protruded from the end portions 555a in the track-width direction of each first coil piece 555. The top surfaces of the connection layers 561 are flush with the top surface of the above-described magnetic pole end layer 548, the top surface of the back gap layer 533, and the top surface of the coil insulating layer 536 and, therefore, the top surfaces of the connection layers 561 are in the condition of being exposed at the above-described flattened surface.

Consequently, in the thin film magnetic head shown in FIG. 27, the above-described upper core layer 560 provided on the above-described magnetic pole end layer 548, the coil insulating layer 536, and the back gap layer 533 can be formed on the above-described flattened surface, and the above-described upper core layer 560 can be formed into a predetermined shape. Therefore, the resulting upper core layer 560 can have a predetermined dimension with high precision.

In the thin film magnetic head shown in FIG. 27, since the top surfaces 561a of the above-described connection layers 561 are exposed at the same flattened surface as the above-described coil insulating layer 536, the end portions in the track-width direction (the X direction shown in the drawing) of the above-described second coil pieces 556 can be electrically connected onto the above-described connection layers 561 with reliability and with ease. Consequently, poor electrical contact between the above-described first coil pieces 555 and the second coil pieces 556 can be prevented.

Since all of the top surface of the coil insulating layer 536, top surface of the magnetic pole end layer 548, the top surface of the back gap layer 533, and the top surfaces of the connection layers 561 are provided as the same flattened surface, the slimming of the whole thin film magnetic head can be facilitated.

Since the above-described upper core layer 560 having a linear shape parallel to the layer surface connects between the above-described magnetic pole end layer 548 and the back gap layer 533 and, thereby, the magnetic path is provided, reduction in the magnetic path length can be realized. Since the magnetic path length can be reduced, the speed of magnetic field reversal can be increased, and a thin film magnetic head having excellent high-frequency characteristics can be provided.

The above-described first coil piece 555 and the second coil piece 556 are formed from Cu, Au, or the like having excellent electrical conductivity. The above-described connection layer 561 may not be formed from the same material as that for the above-described first coil piece 555 and the second coil piece 556, and may be formed from a magnetic material or the like, as long as the material has electrical conductivity. Preferably, the above-described connection layer 561 is formed from the same magnetic material as that for the magnetic pole end layer 548. As a result, the above-described connection layers 561 can be formed in the same step as that of the above-described magnetic pole end layer 548 and the back gap layer 533 and, therefore, speedup of the manufacturing process can be achieved.

As described above, the top surface of the above-described coil insulating layer 536 is provided as a flattened surface. In order to realize this, preferably, the above-described coil insulating layer 536 is formed from an inorganic insulating material, e.g., $Al_2O_3$ or $SiO_2$.

The two-dimensional shape of the above-described upper core layer 560 is similar to that of the upper core layer 42 shown in FIG. 4.

In the present embodiment, the material for the upper core layer 560 is differentiated from that for the upper magnetic pole layer 551 of the magnetic pole end layer 548. Consequently, only the upper magnetic pole layer 551 can be formed from a material having a high saturation magnetic flux density, and the upper core layer 560 can be formed from a material having a saturation magnetic flux density lower than that of the upper magnetic pole layer 551. Since the upper magnetic pole layer 551 and the lower magnetic pole layer 549 having high saturation magnetic flux densities are not formed at the rear of the Gd-determining layer 538, the magnetic flux density can be appropriately controlled, leakage of the magnetic flux from both sides of the magnetic pole end layer 548 is reduced, and an S/N ratio of the magnetic head is improved.

Leakage of the magnetic flux from the upper core layer 560 can be further reduced by moving the front-end portion 560a of the upper core layer 560 from the surface facing the recording medium backward in the height direction.

In the present embodiment, the value of resistance can be reduced by allowing the film thickness t1 of the second coil piece 556 on the upper core layer 560 to be larger than the film thickness t2 of the first coil piece 555, and allowing the length dimension W2 of the above-described second coil piece in a first direction orthogonal to the direction of a current flow to be larger than the length dimension W1 of the above-described first coil piece in the first direction. That is, the heat generation of the above-described coil layer 557 can be reduced, and protrusion of the magnetic pole end layer 548 and the vicinity thereof toward the recording medium side can be reduced.

In the magnetic head shown in FIG. 27 and FIG. 28, since the upper core layer 560 having a flat shape connects between the magnetic pole end layer 548 and the back gap layer 533 and, thereby, the magnetic path is provided, the magnetic path length can be reduced compared with that in the magnetic head including a protuberant upper core layer. When the upper core layer 560 has the flat shape, Joule heat generated from the coil layer 557 can be efficiently dissipated to the outside of the magnetic head.

The coil layer 557 has a toroidal coil structure wound around the upper core layer 560.

Consequently, even when the number of turns of the coil layer 557 constituting the magnetic head is decreased, a predetermined recording time can be maintained. Since the number of turns can be decreased, the coil resistance can be reduced and, thereby, heat generation of the magnetic head can be reduced even when the magnet head is driven.

The reduction of the heat generation of the magnetic head leads to reduction of problems, for example, that the magnetic pole end layer 548 and the vicinity thereof protrude from the surface F facing the recording medium.

The thermal expansion coefficient of the magnetic head can be reduced by the use of an inorganic insulating material for the coil insulating layer 536 covering the coil layer 557.

Figure 29:
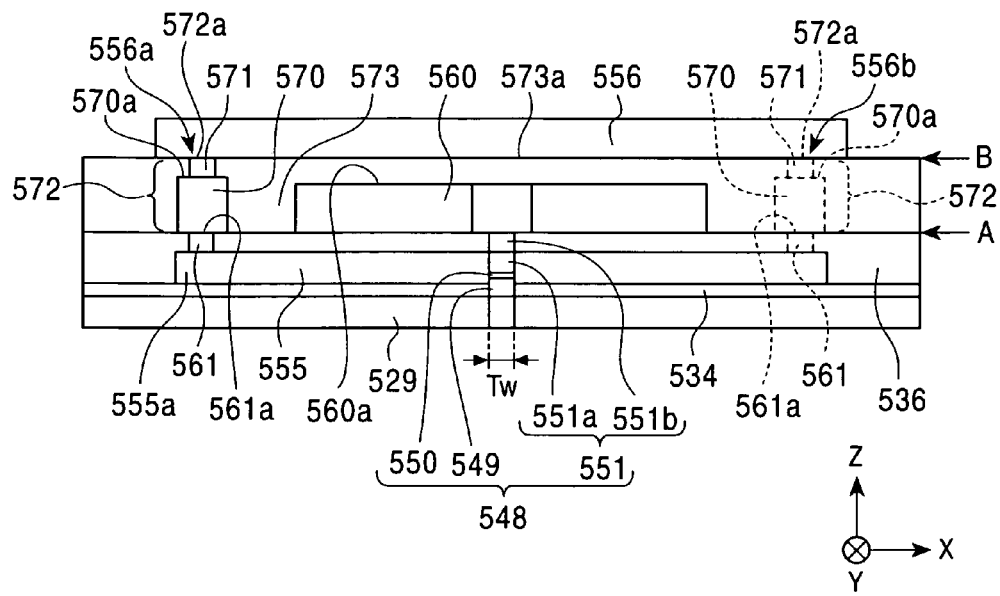
FIG. 29 is a partial front view showing the structure of a thin film magnetic head according to a seventh embodiment of the present invention.

FIG. 29 is a partial front view showing a thin film magnetic head according to the seventh embodiment of the present invention. An MR head, a protective layer 561, and the like constituting the thin film magnetic head are not shown in the drawing, and a structure composed of a first coil piece, a second coil piece, a magnetic pole end layer, and each of layers facing these layers in the film thickness direction is shown, wherein the structure is provided at the location closest to the side of a surface facing a recording medium.

In the thin film magnetic head shown in FIG. 29, the configuration of the layers under the reference surface A is the same as that shown in FIG. 28. That is, a plurality of first coil pieces 555 are provided in the space enclosed with a lower core layer 529, a magnetic pole end layer 548, and a back gap layer 533. The top surfaces 561a of connection layers 561 protruding from the end portions 555a in the track-width direction (the X direction shown in the drawing) of the first coil pieces 555 are flush with the top surface of the above-described magnetic pole end layer 548, the top surface of the coil insulating layer 536, and the top surface of the back gap layer 533.

In FIG. 29, the above-described upper core layer 560 having a predetermined shape with high precision is provided on the flattened surface of the top surface of the magnetic pole end layer 548, the top surface of the coil insulating layer 536, and the top surface of the back gap layer 533, and lifting layers 572 electrically connected to the above-described lower connection layers 561 are provided in both sides in the track-width direction (the X direction shown in the drawing) of the above-described upper core layer 560.

As shown in FIG. 29, the above-described lifting layer 572 has a configuration in which two lifting layers are laminated with a step height. A lower lifting layer 570 of the above-described lifting layer 572 is formed by plating from the material constituting the above-described upper core layer 560. Alternatively, the above-described lower lifting layer 570 may have a laminated structure in which at least one layer of protective film selected from the group consisting of Ni, CuNi, and NiP is provided on at least one layer selected from the group consisting of Cu, FeNi, Ni, Au, FeCo, FeCoRh, and FeCoNi.

An upper lifting layer 571 (hereafter referred to as a lifting-adjusting layer) laminated on the above-described lower lifting layer 570 with a step height has a function of adjusting the total height of the above-described lifting layer 572. As shown in FIG. 29, the lifting-adjusting layer 571 is provided on the lower lifting layer 570 and, thereby, the top surface 572a of the above-described lifting layer 572 is allowed to become higher than the top surface 562a of the above-described upper core layer 560.

The above-described lifting-adjusting layer 571 has electrical conductivity, and is formed from a material which can be applied by plating. Preferably, the above-described lifting-adjusting layer 571 is at least one layer selected from the group consisting of Cu, FeNi, Ni, Au, FeCo, FeCoRh, and FeCoNi. Alternatively, the above-described lifting-adjusting layer 571 may have a structure in which at least one layer of protective film selected from the group consisting of Ni, CuNi, and NiP is provided on a primary layer containing Cu, Co, or Ni.

The bottom surface of the above-described lower lifting layer 570 and the top surface of the above-described connection layer 561 are in the condition of being electrically connected to each other, and the top surface 570a of the lifting layer 570 and the bottom surface of the lifting-adjusting layer 571 are also electrically connected to each other.

The advantage of the two-stage structure of the lifting layer 572, as shown in FIG. 29, is that the top surface 572a of the above-described lifting layer 572 is easily allowed to become higher than the top surface 560a of the above-described upper core layer 560. After the above-described lower lifting layer 570 is provided, the above-described lifting-adjusting layer 571 is provided by plating on the above-described lower lifting layer 570 through a different step.

Since the top surface 572a of the above-described lifting layer 572 is allowed to become higher than the top surface 560a of the above-described upper core layer 560, the top surface 573a of the insulating layer 573 (preferably, formed from an inorganic insulating material) covering the top surface and the side surfaces of the above-described upper core layer 560 can be provided as a flattened surface parallel to the X-Y plane shown in the drawing and, thereby, the above-described second coil pieces 556 can be provided on the above-described flattened surface. As a result, the above-described second coil pieces can highly precisely formed by patterning, and the end portions 556a and 556b of the above-described second coil piece 556 can be electrically connected with reliability and with ease to the top surfaces 572a of the above-described lifting layer 572 exposed at the above-described flattened surface. Since the lifting layer 572 higher than the top surface 560a of the above-described upper core layer 560 is provided, insulation between the above-described second coil pieces 556 and the above-described upper core layer 560 can be further improved.

Figure 30:
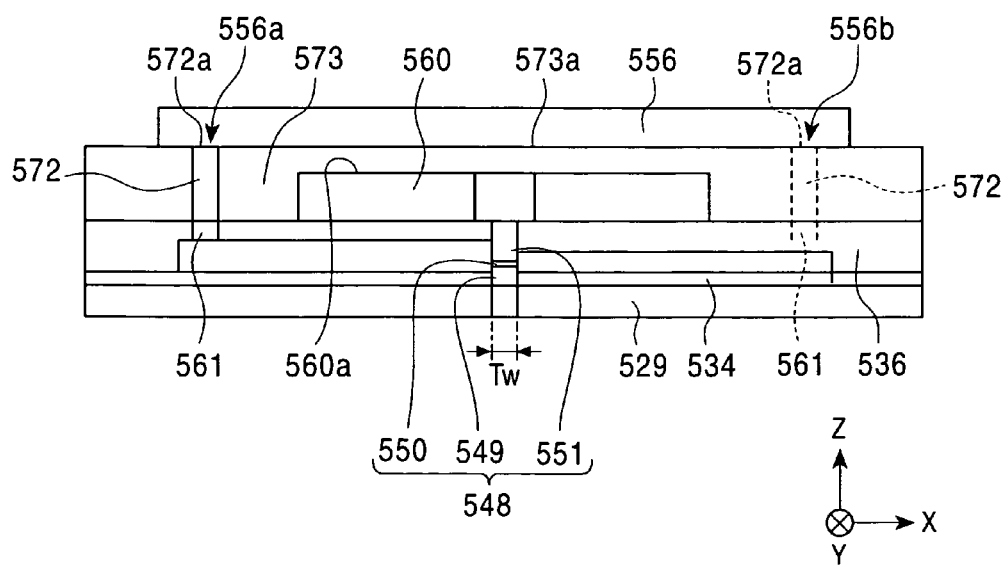
FIG. 30 is a partial front view showing the structure of a thin film magnetic head according to an eighth embodiment of the present invention.

A structure shown in FIG. 30, instead of the structure shown in FIG. 29, allows the top surface 572a of the above-described lifting layer 572 to become higher than the top surface 560a of the above-described upper core layer 560.

In the structure of the thin film magnetic head shown in FIG. 30, lifting layers 572 are provided on the coil insulating layer 536 in both sides of the above-described upper core layer 560 in the track-width direction (the X direction shown in the drawing), and the area of the lifting layer 572 in the film surface direction (a direction parallel to the X-Y plane shown in the drawing) is constant from the bottom surface to the top surface 572a. The lifting layer 572 has a single-layer structure or a multilayer structure of an electrically conductive material, and the top surface 572a of the above-described lifting layer 572 is higher than the top surface 560a of the above-described upper core layer 560, as shown in FIG. 30. Preferably, the lifting layer 572 shown in FIG. 30 is provided by plating, and is at least one layer selected from the group consisting of Cu, FeNi, Ni, Au, FeCo, FeCoRh, and FeCoNi. More preferably, the above-described lifting layer 572 has a laminated structure in which at least one layer of protective film selected from the group consisting of Ni, CuNi, and NiP is provided on at least one primary layer selected from the group consisting of Cu, FeNi, Ni, Au, FeCo, FeCoRh, and FeCoNi.

Consequently, in the thin film magnetic head shown in FIG. 30 as well, the above-described second coil pieces 556 can be provided on the above-described flattened surface. As a result, the above-described second coil pieces 556 can highly precisely formed by patterning, and the end portions 556a and 556b of the above-described second coil piece 556 can be electrically connected with reliability and with ease to the top surfaces 572a of the above-described lifting layers 572 exposed at the above-described flattened surface. Since the lifting layer 572 higher than the top surface 560a of the above-described upper core layer 560 is provided, insulation between the above-described second coil pieces 556 and the above-described upper core layer 560 can be further improved.

Method for manufacturing the thin film magnetic heads shown in FIG. 27 to FIG. 30 are similar to the methods for manufacturing the thin film magnetic heads shown in FIG.

8 to FIG. 19. The magnetic pole end layer 548 is formed by plating instead of the protuberance layer 32, and the upper core layer 560 is formed instead of the laminate 62.

Methods for manufacturing the above-described lifting layers 572 shown in FIG. 29 and FIG. 30 are the same as the methods for manufacturing the above-described lifting layers 72 shown in FIG. 6 and FIG. 7, respectively.

The thin film magnetic head according to the present invention described above in detail is built in a magnetic head device mounted on, for example, a hard disk device. The above-described thin film magnetic head is built in either floating magnetic head or contact magnetic head. The above-described thin film magnetic head can be used for a magnetic sensor and the like in addition to the hard disk device.

What is claimed is:

1. A thin film magnetic head comprising a protuberance layer having a predetermined length in a height direction from a surface facing a recording medium and a back gap layer located at a predetermined distance in the height direction from a rear end surface in the height direction of the protuberance layer, each provided on a lower core layer extending in the height direction from a facing-surface side, a magnetic layer connecting between the protuberance layer and the back gap layer, and a coil layer wound in a toroidal shape around the magnetic layer, wherein a plurality of first coil pieces extending in a direction intersecting the magnetic layer are provided at predetermined spacings in the height direction in a space enclosed with the lower core layer, the protuberance layer, and the back gap layer, connection layers are provided while protruding from end portions in a track-width direction of each first coil piece, and the first coil pieces are covered with a coil insulating layer, wherein all of a top surface of the coil insulating layer, a top surface of the protuberance layer, a top surface of the back gap layer, and top surfaces of the connection layers are provided as the same flattened surface, wherein the magnetic layer is provided on the flattened surface of the coil insulating layer, the protuberance layer, and the back gap layer, wherein a plurality of second coil pieces crossing over the magnetic layer are provided on the magnetic layer with an insulating layer therebetween, and wherein end portions in the track-width direction of each second coil piece are electrically connected to the top surfaces of the connection layers exposed at the flattened surface, and end portions of the first coil pieces adjacent to each other are connected via the second coil pieces, so that the coil layer wound in the toroidal shape is provided.

2. A thin film magnetic head comprising a protuberance layer having a predetermined length in a height direction from a surface facing a recording medium and a back gap layer located at a predetermined distance in the height direction from a rear end surface in the height direction of the protuberance layer, each provided on a lower core layer extending in the height direction from a facing-surface side, a magnetic layer connecting between the protuberance layer and the back gap layer, and a coil layer wound in a toroidal shape around the magnetic layer, wherein a plurality of first coil pieces extending in a direction intersecting the magnetic layer are provided in a space enclosed with the lower core layer, the protuberance layer, and the back gap layer, and the first coil pieces are covered with a coil insulating layer, wherein the magnetic layer is provided on the coil insulating layer, the protuberance layer, and the back gap layer, and the magnetic layer is covered with an insulating layer having a top surface provided as a flattened surface, wherein a plurality of second coil pieces crossing over the magnetic layer are provided on the flattened surface of the insulating layer, and wherein top surfaces of the connection layers electrically connected to end portions in a track-width direction of each first coil piece are exposed at a surface flush with the flattened surface, end portions in the track-width direction of each second coil piece are electrically connected to the top surfaces of the connection layers and, thereby, the end portions of the first coil pieces adjacent to each other are connected via the second coil pieces, so that the coil layer wound in the toroidal shape is provided.

3. A thin film magnetic head comprising a protuberance layer having a predetermined length in a height direction from a surface facing a recording medium and a back gap layer located at a predetermined distance in the height direction from a rear end surface in the height direction of the protuberance layer, each provided on a lower core layer extending in the height direction from a facing-surface side, a magnetic layer connecting between the protuberance layer and the back gap layer, and a coil layer wound in a toroidal shape around the magnetic layer, wherein a plurality of first coil pieces extending in a direction intersecting the magnetic layer are provided in a space enclosed with the lower core layer, the protuberance layer, and the back gap layer, lower connection layers are provided while protruding from end portions in a track-width direction of each first coil piece, and the first coil pieces are covered with a coil insulating layer, wherein all of a top surface of the coil insulating layer, a top surface of the protuberance layer, a top surface of the back gap layer, and top surfaces of the lower connection layers are provided as the same flattened surface, wherein the magnetic layer is provided on the flattened surface of the coil insulating layer, the protuberance layer, and the back gap layer, and upper connection layers electrically connected to the lower connection layers are provided, wherein the magnetic layer is covered with an insulating layer having a top surface provided as a flattened surface, and top surfaces of the upper connection layers are exposed at surfaces flush with the flattened surface, and wherein a plurality of second coil pieces crossing over the magnetic layer are provided on the flattened surface of the insulating layer, end portions in the track-width direction of each second coil piece are electrically connected to the upper connection layers exposed at the flattened surface, and the end portions of the first coil pieces adjacent to each other are connected via the second coil pieces, so that the coil layer wound in the toroidal shape is provided.

4. The thin film magnetic head according to claim 1, wherein a laminated structure comprising a lower magnetic pole layer, a gap layer, and an upper magnetic pole layer for serving as the magnetic layer in that order from the bottom is provided on the protuberance layer, and a track width Tw is determined by a width dimension in the track-width direction of the laminated structure in a facing-surface.

5. The thin film magnetic head according to claim 1, wherein the protuberance layer is a magnetic pole end layer in which at least a lower magnetic pole layer, a gap layer formed from a non-magnetic metal material, and an upper magnetic pole layer are provided by plating in that order from the bottom and a track width Tw is regulated by a width dimension in the track-width direction in a facing-surface, and the magnetic layer is laminated on the magnetic pole end layer.

6. The thin film magnetic head according to claim 5, wherein a saturation magnetic flux density of the magnetic layer is lower than that of the upper magnetic pole layer.

7. The thin film magnetic head according to claim 1, wherein, with respect to at least one pair of the first coil pieces adjacent to each other, a distance between the end portions adjacent to each other in the height direction of the first coil pieces is larger than a minimum distance between the first coil pieces in a region overlapping the magnetic layer.

8. The thin film magnetic head according to claim 7, wherein the plurality of first coil pieces include portions parallel to each other in the region overlapping the magnetic layer.

9. The thin film magnetic head according to claim 1, wherein, with respect to at least one pair of the second coil pieces adjacent to each other, a distance between the end portions adjacent to each other in the height direction of the second coil pieces is larger than a minimum distance between the second coil pieces in a region overlapping the magnetic layer.

10. The thin film magnetic head according to claim 9, wherein the plurality of second coil pieces include portions parallel to each other in the region overlapping the magnetic layer.

11. The thin film magnetic head according to claim 1, wherein a length dimension of the second coil piece in a first direction orthogonal to a direction of a current flow is larger than a length dimension of the first coil piece in the first direction.

12. The thin film magnetic head according to claim 1, wherein a film thickness of the second coil piece is larger than a film thickness of the first coil piece.

13. The thin film magnetic head according to claim 2, wherein a laminated structure comprising a lower magnetic pole layer, a gap layer, and an upper magnetic pole layer for serving as the magnetic layer in that order from the bottom is provided on the protuberance layer, and a track width Tw is determined by a width dimension in the track-width direction of the laminated structure in a facing-surface.

14. The thin film magnetic head according to claim 2, wherein the protuberance layer is a magnetic pole end layer in which at least a lower magnetic pole layer, a gap layer formed from a non-magnetic metal material, and an upper magnetic pole layer are provided by plating in that order from the bottom and a track width Tw is regulated by a width dimension in the track-width direction in a facing-surface, and the magnetic layer is laminated on the magnetic pole end layer.

15. The thin film magnetic head according to claim 14, wherein a saturation magnetic flux density of the magnetic layer is lower than that of the upper magnetic pole layer.

16. The thin film magnetic head according to claim 2, wherein, with respect to at least one pair of the first coil pieces adjacent to each other, a distance between the end portions adjacent to each other in the height direction of the first coil pieces is larger than a minimum distance between the first coil pieces in a region overlapping the magnetic layer.

17. The thin film magnetic head according to claim 16, wherein the plurality of first coil pieces include portions parallel to each other in the region overlapping the magnetic layer.

18. The thin film magnetic head according to claim 2, wherein, with respect to at least one pair of the second coil pieces adjacent to each other, a distance between the end portions adjacent to each other in the height direction of the second coil pieces is larger than a minimum distance between the second coil pieces in a region overlapping the magnetic layer.

19. The thin film magnetic head according to claim 18, wherein the plurality of second coil pieces include portions parallel to each other in the region overlapping the magnetic layer.

20. The thin film magnetic head according to claim 2, wherein a length dimension of the second coil piece in a first direction orthogonal to a direction of a current flow is larger than a length dimension of the first coil piece in the first direction.

21. The thin film magnetic head according to claim 2, wherein a film thickness of the second coil piece is larger than a film thickness of the first coil piece.

22. The thin film magnetic head according to claim 3, wherein a laminated structure comprising a lower magnetic pole layer, a gap layer, and an upper magnetic pole layer for serving as the magnetic layer in that order from the bottom is provided on the protuberance layer, and a track width Tw is determined by a width dimension in the track-width direction of the laminated structure in a facing-surface.

23. The thin film magnetic head according to claim 3, wherein the protuberance layer is a magnetic pole end layer in which at least a lower magnetic pole layer, a gap layer formed from a non-magnetic metal material, and an upper magnetic pole layer are provided by plating in that order from the bottom and a track width Tw is regulated by a width dimension in the track-width direction inafacing-surface, and the magnetic layer is laminated on the magnetic pole end layer.

24. The thin film magnetic head according to claim 23, wherein a saturation magnetic flux density of the magnetic layer is lower than that of the upper magnetic pole layer.

25. The thin film magnetic head according to claim 3, wherein, with respect to at least one pair of the first coil pieces adjacent to each other, a distance between the end portions adjacent to each other in the height direction of the first coil pieces is larger than a minimum distance between the first coil pieces in a region overlapping the magnetic layer.

26. The thin film magnetic head according to claim 25, wherein the plurality of first coil pieces include portions parallel to each other in the region overlapping the magnetic layer.

27. The thin film magnetic head according to claim 3, wherein, with respect to at least one pair of the second coil pieces adjacent to each other, a distance between the end portions adjacent to each other in the height direction of the second coil pieces is larger than a minimum distance between the second coil pieces in a region overlapping the magnetic layer.

28. The thin film magnetic head according to claim 27, wherein the plurality of second coil pieces include portions parallel to each other in the region overlapping the magnetic layer.

29. The thin film magnetic head according to claim 3, wherein a length dimension of the second coil piece in a first direction orthogonal to a direction of a current flow is larger than a length dimension of the first coil piece in the first direction.

30. The thin film magnetic head according to claim 3, wherein a film thickness of the second coil piece is larger than a film thickness of the first coil piece.

31. A method for manufacturing a thin film magnetic head, comprising the steps of:
    (a) forming a lower core layer extending in a height direction from a side of a surface facing a recording medium;
    (b) forming a coil insulating substrate layer on the lower core layer and, thereafter, forming a plurality of first coil pieces extending in a direction intersecting the height direction, at predetermined spacings in the height direction, on the coil insulating substrate layer in a predetermined region;
    (c) forming a protuberance layer from a facing-surface toward the height direction on the lower core layer while a location of the protuberance layer is suitable for avoiding contact with the first coil pieces, forming a back gap layer on the lower core layer while a location of the back gap layer is at a distance in the height direction from a rear end surface in the height direction of the protuberance layer and is suitable for avoiding contact with the first coil pieces, and forming connection layers protruding from end portions in a track-width direction of each first coil piece;
    (d) covering the first coil pieces with a coil insulating layer and, thereafter, polishing the coil insulating layer, the protuberance layer, the back gap layer, and the connection layers until a top surface of the protuberance layer, a top surface of the coil insulating layer, a top surface of the back gap layer, and top surfaces of the connection layers are provided as the same flattened surface;
    (e) forming a magnetic layer on the flattened surface of the coil insulating layer, the protuberance layer, and the back gap layer to connect between the protuberance layer and the back gap layer; and
    (f) forming an insulating layer on the magnetic layer, forming a plurality of second coil pieces on the insulating layer while the second coil pieces cross over the magnetic layer, connecting end portions in the track-width direction of each second coil piece to the top surfaces of the connection layers exposed at the flattened surface, and connecting the end portions of the first coil pieces adjacent to each other via the second coil pieces, so that a coil layer wound in a toroidal shape is provided.

32. The method for manufacturing a thin film magnetic head according to claim 31, wherein the protuberance layer, the back gap layer, and the connection layers are simultaneously formed from the same material in the step (c).

33. The method for manufacturing a thin film magnetic head comprising the steps of:
    (a) forming a lower core layer extending in a height direction from a side of a surface facing a recording medium;
    (b) forming a coil insulating substrate layer on the lower core layer and, thereafter, forming a plurality of first coil pieces extending in a direction intersecting the height direction, at predetermined spacings in the height direction, on the coil insulating substrate layer in a predetermined region;
    (c) forming a protuberance layer from a facing-surface toward the height direction on the lower core layer while a location of the protuberance layer is suitable for avoiding contact with the first coil pieces, forming a back gap layer on the lower core layer while a location of the back gap layer is at a distance in the height direction from a rear end surface in the height direction of the protuberance layer and is suitable for avoiding contact with the first coil pieces, and forming connection layers protruding from end portions in a track-width direction of each first coil piece;
    (d) covering the first coil pieces with a coil insulating layer and, thereafter, polishing the coil insulating layer, the protuberance layer, the back gap layer, and the connection layers until a top surface of the protuberance layer, a top surface of the coil insulating layer, a top surface of the back gap layer, and top surfaces of the connection layers are provided as the same flattened surface;
    (e) forming a magnetic layer on the flattened surface of the coil insulating layer, the protuberance layer, and the back gap layer to connect between the protuberance layer and the back gap layer;
    (f) forming upper connection layers on the connection layers while the upper connection layers extend to the locations higher than a top surface of the magnetic layer;
    (g) covering the magnetic layer with an insulating layer and, thereafter, polishing the insulating layer and the upper connection layers until the top surfaces of the upper connection layers and a top surface of the insulating layer are provided as the same flattened surface; and
    (h) forming a plurality of second coil pieces on the flattened surface of the insulating layer while the second coil pieces cross over the magnetic layer, connecting the end portions in the track-width direction of each second coil piece to the top surfaces of the upper connection layers exposed at the flattened surface, and connecting the end portions of the first coil pieces adjacent to each other via the second coil pieces, so that a coil layer wound in a toroidal shape is provided.

* * * * *